(12) United States Patent
Seimiya et al.

(10) Patent No.: US 10,309,366 B2
(45) Date of Patent: Jun. 4, 2019

(54) ENGINE CONTROL DEVICE

(71) Applicant: HITACHI AUTOMOTIVE SYSTEMS, LTD., Hitachinaka-shi, Ibaraki (JP)

(72) Inventors: Masashi Seimiya, Ibaraki (JP); Yoshihiko Akagi, Ibaraki (JP)

(73) Assignee: HITACHI AUTOMOTIVE SYSTEMS, LTD., Hitachinaka-shi (JP)

(*) Notice: Subject to any disclaimer, the term of this patent is extended or adjusted under 35 U.S.C. 154(b) by 0 days.

(21) Appl. No.: 15/741,526

(22) PCT Filed: Jul. 1, 2016

(86) PCT No.: PCT/JP2016/069582
§ 371 (c)(1),
(2) Date: Jan. 3, 2018

(87) PCT Pub. No.: WO2017/010310
PCT Pub. Date: Jan. 19, 2017

(65) Prior Publication Data
US 2018/0195485 A1 Jul. 12, 2018

(30) Foreign Application Priority Data
Jul. 15, 2015 (JP) .................................. 2015-140951

(51) Int. Cl.
*F02P 3/00* (2006.01)
*F02P 15/00* (2006.01)
(Continued)

(52) U.S. Cl.
CPC ................... *F02P 3/05* (2013.01); *F02P 3/00* (2013.01); *F02P 15/02* (2013.01); *F02P 15/10* (2013.01); *F02P 17/12* (2013.01)

(58) Field of Classification Search
CPC ...... F02P 3/05; F02P 3/00; F02P 15/02; F02P 15/10; F02P 17/12
See application file for complete search history.

(56) References Cited

U.S. PATENT DOCUMENTS

| 5,571,245 A | 11/1996 | Ooyabu et al. |
| 2003/0168049 A1* | 9/2003 | Zarkhin ............... F02P 3/0453 123/609 |

(Continued)

FOREIGN PATENT DOCUMENTS

| DE | 10 2007055700 A1 | 6/2008 |
| DE | 10 2008015849 A1 | 5/2009 |

(Continued)

OTHER PUBLICATIONS

Japanese Office Action issued in corresponding Application No. 2017-528382 dated Sep. 18, 2018.

(Continued)

*Primary Examiner* — Thomas Moulis
(74) *Attorney, Agent, or Firm* — Foley & Lardner LLP

(57) ABSTRACT

Provided is an engine control device which can suppress a shortage of output terminals of the control unit and an increase of costs even in a multiple-cylinder internal combustion engine equipped with ignition energy supply units of two systems. An engine control device controls a multiple-cylinder engine in which ignition energy supply units of two systems are provided for every cylinder. A signal is transmitted through a common signal line to a plurality of ignition energy supply units of one system among the ignition energy supply units of the two systems to control the ignition energy supply units of the one system.

19 Claims, 18 Drawing Sheets

(51) Int. Cl.
*F02P 3/05* (2006.01)
*F02P 15/10* (2006.01)
*F02P 15/02* (2006.01)
*F02P 17/12* (2006.01)

(56) References Cited

U.S. PATENT DOCUMENTS

| | | |
|---|---|---|
| 2007/0267004 A1 | 11/2007 | Yamauchi |
| 2008/0127937 A1 | 6/2008 | Toriyama et al. |
| 2009/0108846 A1 | 4/2009 | Koda et al. |
| 2011/0041803 A1* | 2/2011 | Qu .................... F02P 15/10 123/406.2 |
| 2014/0102412 A1 | 4/2014 | Czekala et al. |
| 2014/0360476 A1 | 12/2014 | Huberts et al. |
| 2015/0167623 A1* | 6/2015 | Sanders ................ F02P 3/08 123/605 |
| 2015/0330290 A1* | 11/2015 | Glugla ............. F02D 19/0689 123/298 |
| 2017/0022959 A1* | 1/2017 | Huberts .................. F02P 3/05 |

FOREIGN PATENT DOCUMENTS

| | | |
|---|---|---|
| JP | S64-083863 A | 3/1989 |
| JP | H08-128381 A | 5/1996 |
| JP | 2000-240542 A | 9/2000 |
| JP | 2007-120374 A | 5/2007 |
| JP | 2007-309148 A | 11/2007 |
| JP | 2015-025403 A | 2/2015 |

OTHER PUBLICATIONS

International Search Report with English translation and Written Opinion issued in corresponding application No. PCT/JP2016/069582 dated Oct. 4, 2016.

Third Party Observation for Application No. 16824290.7, available online Oct. 22, 2018, 3 pages.

* cited by examiner

ENGINE CONTROL DEVICE

TECHNICAL FIELD

The present invention relates to an engine control device which performs an ignition control to overlap spark discharges from an ignition plug of an internal combustion engine.

BACKGROUND ART

In recent years, a reduction of fuel consumption of an internal combustion engine has been important. A method of improving the fuel efficiency is increasingly employed in which a large amount of EGR (Exhaust Gas Recirculation) gas is introduced in a light-loaded operation region for the purpose of low fuel consumption on the basis of the fact that pumping loss is reduced by introducing an EGR gas. However, in such a case, an inert gas is increased to reduce a ratio of the air which is newly introduced into a cylinder of the internal combustion engine, and accordingly a ratio of an appropriate air-fuel mixture is reduced around an ignition plug. Therefore, a secure ignition and a stable combustion are hardly achieved in a short-term discharge, and the internal combustion engine comes to be in an unstable state due to an incorrect combustion.

In an ignition device for an internal combustion engine, a state of the air-fuel mixture deviates in the vicinity of the ignition plug so as to cause a state where the air-fuel ratio is reduced or a state where an inert gas such as an EGR gas is mixed. In such a state, it is considered as a very important technique that an unstable ignitionability of the air-fuel mixture is improved in a short-term discharge and the fuel efficiency of the internal combustion engine is improved by improving the ignitionability and by making the combustion stable. For example, there is a well-known technique "Ignition device of overlap discharge type for internal combustion engine" (PTL 1) as the related art.

CITATION LIST

Patent Literature

PTL 1: JP 2000-240542 A

SUMMARY OF INVENTION

Technical Problem

According to the ignition control of the ignition system of the overlap discharge type disclosed in PTL 1, when an overlap discharge time is controlled, current consumption is excessively increased when the overlap discharge is performed over the entire region which may cause a defect such as deterioration and exhaustion of a battery mounted in a vehicle or the like. Therefore, an execution region of the overlap discharge is necessarily limited. In order to limit the overlap discharge region, there is a need for a control unit to give information of an overlap request signal which is used to make a limitation on a boosting circuit.

In addition, according to an ignition control of the ignition system of the overlap discharge type disclosed in PTL 1, there is a need to supply large discharge energy to the ignition plug for a long time. Therefore, a predetermined voltage (for example, 500 V) or more is necessarily added to a discharge current of an ignition coil from a boosting circuit which is separately provided. In the case of a multiple-cylinder internal combustion engine, the boosting circuit is necessarily configured to handle the cylinders. In a case where an execution region of the overlap discharge is limited, or in a case where the ignition energy of the overlap discharge is adjusted, there is a need to transmit an overlap request signal for the cylinders from the control unit. There is a problem causing an increase of the number of outputs of the control unit, an increase of the number of signal lines connecting the control unit and the boosting circuit, a shortage of output terminals of the control unit, and an increase of costs due to an increase of the number of output circuits of the control unit and an increase of signal lines.

In PTL 1, the ignition energy is supplied by two systems of the boosting circuit which is provided in the ignition plug separately from the ignition coil. However, an ignition system equipped with ignition energy supply units of the two systems may cause the same problem regardless of the ignition coil and the boosting circuit.

The invention has been made to solve such a problem, and an object thereof is to provide an engine control device which can suppress a shortage of output terminals of the control unit and an increase of costs even in a multiple-cylinder internal combustion engine equipped with the ignition energy supply units of two systems.

Solution to Problem

In order to solve the technical problem, an engine control device according to the present invention is an engine control device which controls a multiple-cylinder engine in which ignition energy supply units of two systems are provided for every cylinder, wherein a signal is transmitted through a common signal line to a plurality of ignition energy supply units of one system among the ignition energy supply units of the two systems to control the ignition energy supply units of the one system.

Advantageous Effects of Invention

According to an ignition device for an internal combustion engine of the invention, there is provided an ignition system equipped with ignition energy supply units of two systems for every cylinder. The ignition energy supply units of the two systems can be controlled only by adding one signal line with respect to the ignition system equipped only with the ignition energy supply units of one system. It is possible to provide an engine control device which can suppress a shortage of output terminals of the control unit and an increase of costs even in a multiple-cylinder internal combustion engine.

DESCRIPTION OF EMBODIMENTS

Hereinafter, the description will be given about embodiments of the invention in detail with reference to the drawings, but the invention is not limited to the following embodiments. Various modifications and applications may be contained in the technical concept of the invention.

First Embodiment

First, the description will be given with reference to FIGS. 1 to 11 about a first configuration of a control system of an internal combustion engine to which the invention is applied. Herein, the embodiment illustrated in FIG. 1 is a 4-cylinder internal combustion engine of a so-called port injection type, and an engine of a cylinder direct injection type may be applied regardless of the number of cylinders.

Figure 1:
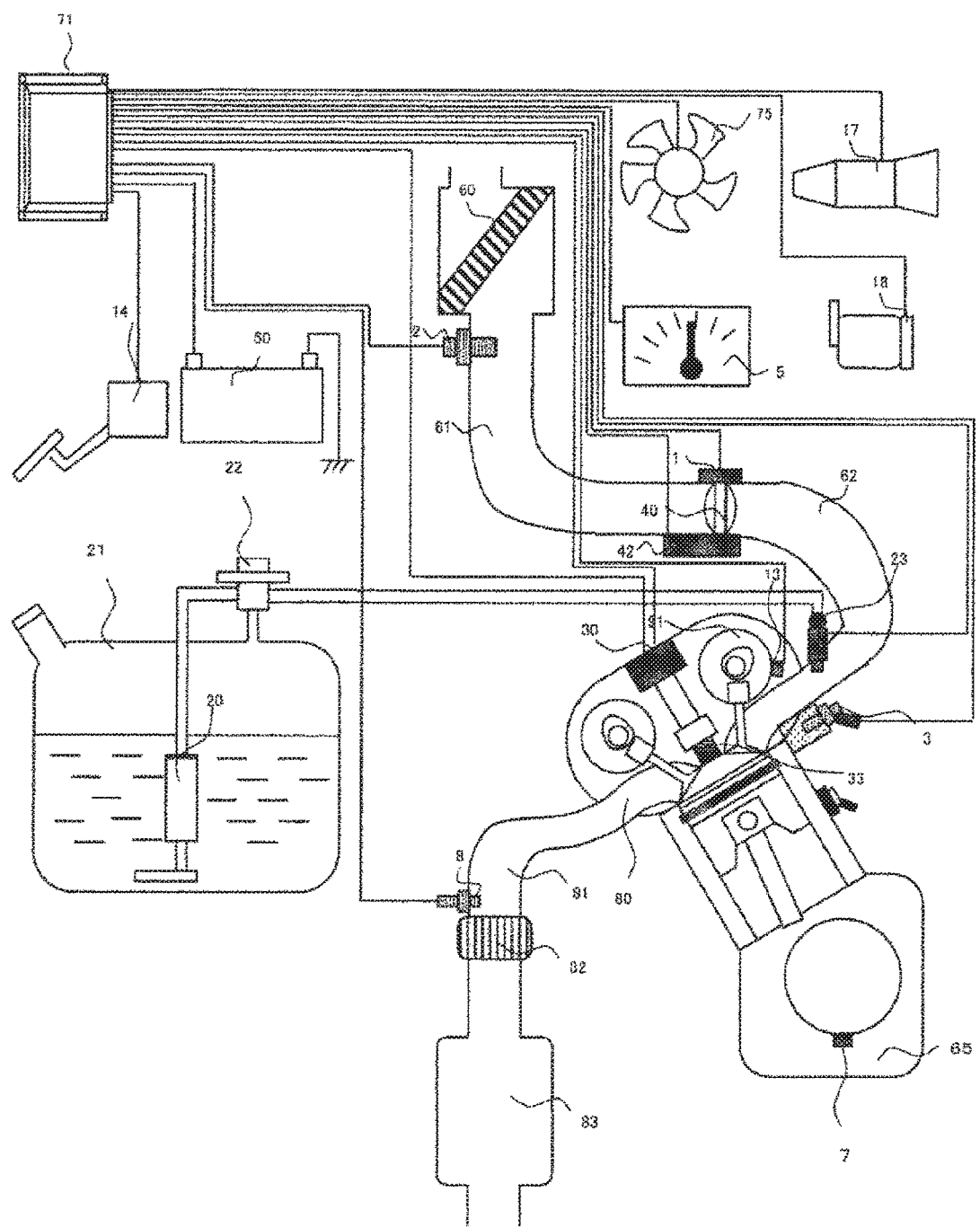
FIG. 1 is a diagram illustrating a configuration of an engine control system according to an embodiment of the invention.

FIG. 1 is a diagram illustrating a configuration of the internal combustion engine control system according to the first configuration. The air sucked into an internal combustion engine 65 passes through an air cleaner 60, and is introduced to an air flow sensor 2 of a hot wire type. A hot-wire air flow sensor is used in the air flow sensor 2 of the hot wire type. A signal corresponding to an intake air amount is output from the air flow sensor 2 of the hot wire type, and an intake air temperature signal is output measured by the intake air temperature sensor 2 using a thermistor. Next, the intake air passes through a connected duct 61 and a throttle valve 40 which controls an air flow rate, and enters a collector 62. In addition, the throttle valve is operated by a throttle drive motor 42 which is driven by a control unit 71. The air entered the collector 62 is distributed into intake pipes connected to the engine, and sucked into the cylinder. A valve timing variation mechanism is equipped in a valve drive system to perform a feedback control to adjust the valve to be a target angle. In addition, a crank angle sensor 7 attached to a cylinder block outputs a pulse at every predetermined crank angle, and the output is input to the control unit 71.

A fuel is sucked and compressed by a fuel pump 20 from a fuel tank 21, adjusted in pressure to be a certain pressure by a pressure regulator 22, and injected from an injector 23 provided in the intake pipe into the intake pipe.

A throttle sensor 1 is attached to the throttle valve 40 to detect an opening of the throttle valve. A signal of the sensor is input to the control unit 71 to perform a feedback control of the opening of the throttle valve 40 and to detect a complete close position and an acceleration. Further, a target opening of the feedback control is obtained from a driver's stepping amount detected by an accelerator opening sensor 14 and an amount of an idle rotation speed control (that is, ISC control).

A water temperature sensor 3 is attached to the internal combustion engine 65 to detect a coolant temperature. A signal of the sensor is input to the control unit 71 to detect a warming-up state of the internal combustion engine 65, and a target rotation speed is set at the time of increasing a fuel injection amount, correcting an ignition timing, turning on/off a radiator fan 75, and an idle operation. In addition, an air condition switch 18 which monitors a state of an air-conditioning clutch and a neutral switch 17 which is built in a transmission to monitor a state of a drive system are attached to calculate a target rotation speed at an idle time and a load correction amount.

An air-fuel ratio sensor 8 is mounted in an exhaust pipe of the engine, and outputs a signal according to an oxygen concentration in the exhaust gas. The signal is input to the control unit 71, and used to adjust a pulse width of a fuel injection to be a target air-fuel ratio required according to an operation situation.

An ignition coil 30 is provided with two coils (a main coil and a sub coil), each of which is connected to the control unit 71. An ignition signal and a timing signal are input according to an energizing time and an ignition timing of each coil which are calculated by the control unit 71. The discharging caused by the main coil and the discharging caused by the sub coil are overlapped to be output, and a spark discharge of an ignition plug 33 occurs.

Figure 2:
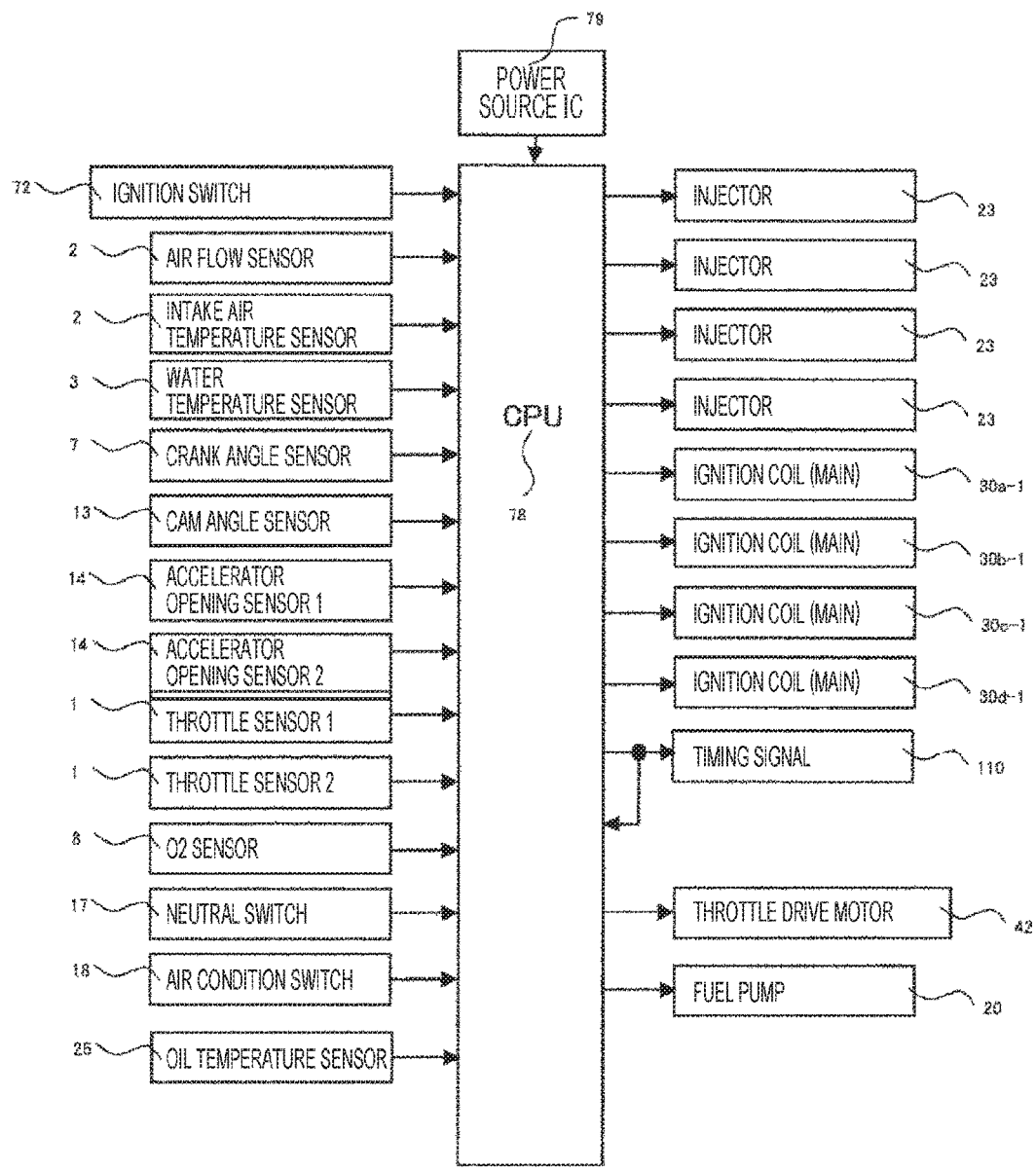
FIG. 2 is a diagram illustrating a configuration of a control unit according to an embodiment of the invention.

Next, the description will be given about an input/output signal of the control unit 71 of an automobile according to this embodiment using FIG. 2. The control unit 71 is configured by a CPU 78 and a power source IC 79 as illustrated in FIG. 2. Herein, as the signals input to the control unit 71 organized using this drawing, there are input signals from the air flow sensor, the built-in intake air temperature sensor 2, the crank angle sensor 7, the throttle sensor 1, the water temperature sensor 3, an oil temperature sensor 25, and the accelerator opening sensor 14. In addition, the output signal from the control unit 71 is output to the injector 23, a fuel pump 20, the ignition coil (main) 30, a timing signal 110, and the throttle drive motor 42. Further, the timing signal 110 is configured to receive the output signal and to monitor an output result.

Figure 3:
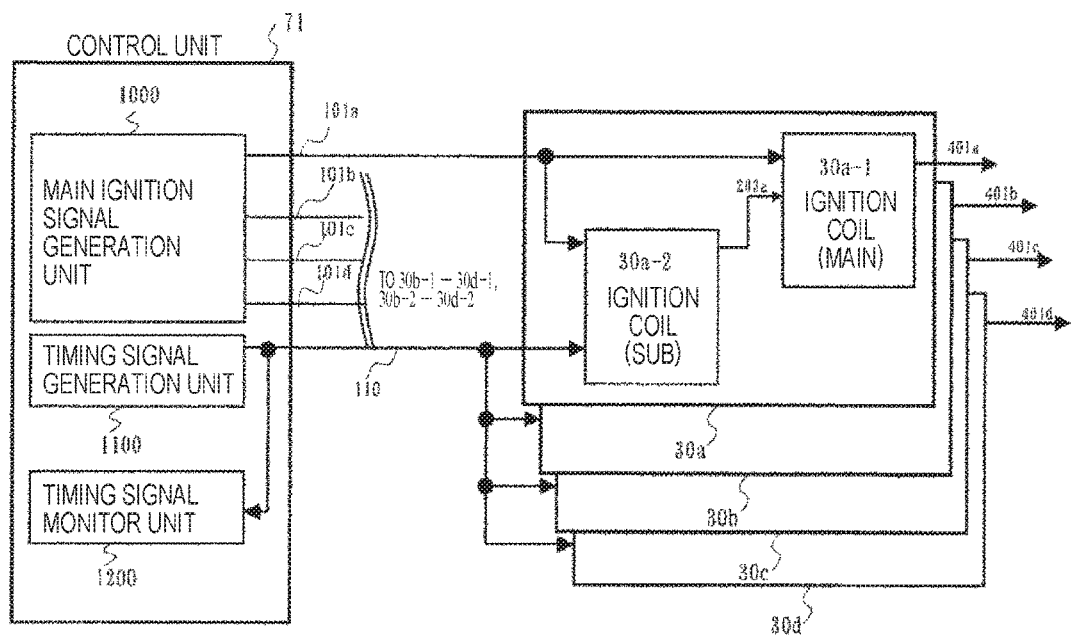
FIG. 3 is a diagram illustrating a configuration of an engine control system according to a first embodiment of the invention.

Next, FIG. 3 illustrates a configuration of an engine control device according to this embodiment in which the 4-cylinder internal combustion engine is exemplified. First, main ignition signals 101a to 101d for cylinders are output from a main ignition signal generation unit 1000 mounted in the control unit 71, and signal lines for transmitting the respective signals are connected to coils 30a to 30d provided in the respective cylinders. The coil 30a is provided with two coils of an ignition coil (main) 30a-1 and an ignition coil (sub) 30a-2 therein, and the ignition coil (main) 30a-1 and the ignition coil (sub) 30a-2 are connected to an overlapping discharge line 203a in series. A signal line for transmitting the ignition signal 101a output from the control unit 71 is connected to the ignition coil (main) 30a-1 and the ignition coil (sub) 30a-2.

Next, the timing signal 110 is output from a timing signal generation unit 1100 mounted in the control unit 71 through one common signal line. One side of the common signal line for transmitting the timing signal 110 is connected to the control unit 71, and the other side is branched in the middle thereof. The branched signal lines are connected to the ignition coils (sub) 30a-2 to 30d-2 which are disposed on a side near the control unit with respect to the ignition coil (main). With such an arrangement, the timing signal transmitted from the control unit 71 is input to the ignition coils (sub) 30a-2 to 30d-2, and the outputs of the ignition coils (sub) 30a-2 to 30d-2 are input to the ignition coils (main) 30a-1 to 30d-1.

Further, in FIG. 3, the ignition coil (main) 30a-1 and the ignition coil (sub) 30a-2 are illustrated by one coil 30a, and the ignition coil (main) 30a-1 and the ignition coil (sub) 30a-2 may be separately and independently configured without using the coil 30a.

In other words, the control unit of this embodiment transmits the timing signal to a plurality of ignition energy supply units of one system (that is, a plurality of ignition coils (sub)) through a common signal line (one signal line) among ignition energy supply units of two systems illustrated by the ignition coils (main) and the ignition coils (sub) so as to control the ignition energy supply units (a plurality of ignition coils (sub)) of one system.

In addition, a timing signal monitor unit 1200 is provided in the control unit 71 to monitor the operation of the timing signal 110, and detects an abnormality of the ignition coil (sub) by monitoring the operation of the timing signal. Specifically, in a case where an abnormality occurs in the ignition coil (sub), the timing signal 110 is pulled up or down in the ignition coil (sub) to fix the potential. Therefore, the timing signal monitor value detected by the timing signal monitor unit 1200 is fixed even when the timing signal 110 is commanded by the control unit 71, so that the control unit 71 can determine control and abnormality from a difference between the command of the timing signal 110 and a monitor value.

In other words, the control unit of this embodiment receives the timing signal through the command signal line (one signal line) from the plurality of ignition energy supply units of one system (that is, the plurality of ignition coils (sub)) among the ignition energy supply units of two systems illustrated by the ignition coil (main) and the ignition coil (sub) so as to detect an abnormality of the plurality of ignition energy supply units (the plurality of ignition coils (sub)) of one system.

Figure 4:
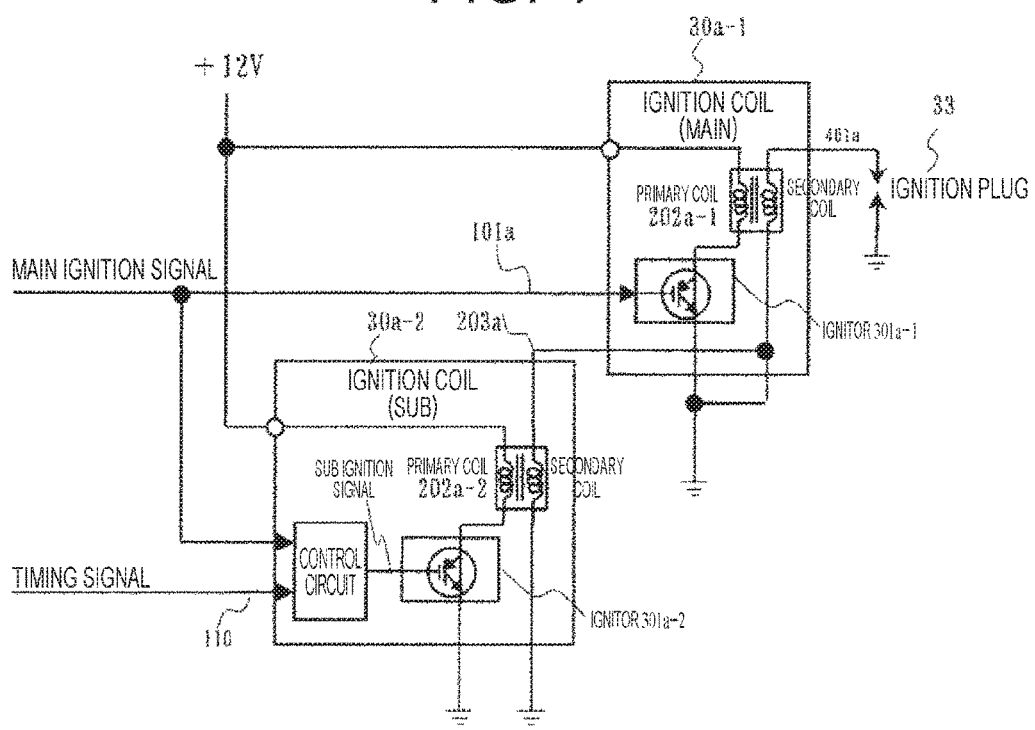
FIG. 4 is a diagram for describing an ignition control device according to the first embodiment.

FIG. 4 is a diagram illustrating a detailed connection between the ignition coil (main) 30a-1 and the ignition coil (sub) 30a-2. The ignition coil (main) 30a-1 is configured by an ignitor, a primary coil, and a secondary coil. The main ignition signal 101a output from the control unit 71 is input to the ignitor, and the current of the primary coil is controlled by the main ignition signal 101a, so that the ignition of the ignition plug 33 is performed.

The ignition coil (sub) 30a-2 is configured by an ignitor, a primary coil, a secondary coil, and a control circuit. The control circuit receives the main ignition signal 101a which is an ignition signal of the ignition energy supply units of the other side belonging to the same cylinder as that of the ignition coil (sub) 30a-2 and the timing signal 110. At this time, the control circuit determines whether the cylinder is an ignition cylinder using the ignition signal of the ignition energy supply units of the other side, and generates a sub ignition signal with respect to the ignition coil (sub) 30a-2 according to the energizing time commanded by the timing signal.

The current generated in the secondary coil is controlled by controlling the current of the primary coil using the sub ignition signal output from the control circuit. The upstream side of the secondary coil of the ignition coil (sub) 30a-2 is connected to the downstream side of the secondary coil of the ignition coil (main) 30a-1, and the secondary coil of the ignition coil (main) 30a-1 and the secondary coil of the ignition coil (sub) 30a-2 are connected in series with respect to the ignition plug 33.

Figure 5:
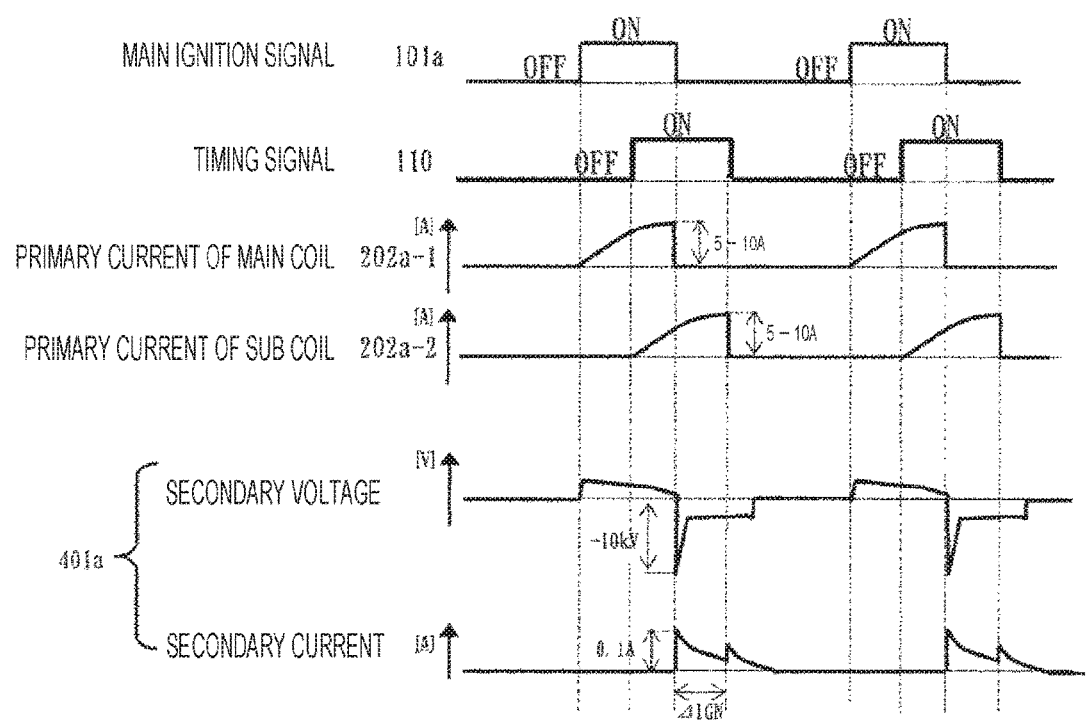
FIG. 5 is a timing chart of the ignition control device according to the first embodiment.

FIG. 5 is a timing chart illustrating input/output waveforms of the coil 30 configured as illustrated in FIG. 4. Herein, there is illustrated a relation among the main ignition control signal 101, a primary current with respect to the timing signal 110, and a discharge output (a secondary voltage and a secondary current) 401 in the coil 30 in a case where the air-fuel mixture compressed in one cylinder of the internal combustion engine ignites.

Specifically, a transistor in an ignitor 301a-1 is switched at an ON timing of a rising edge of a rectangular waveform of the main ignition signal 101a, and a magnetic energy is accumulated in the ignition coil (main) 30a-1 by a primary current in a range from 5 to 10 A flowing on the primary side of the ignition coil (main) 30a-1. The transistor in the ignitor 301a-1 is switched at an OFF timing (so-called ignition timing) of a falling edge of a rectangular waveform of the main ignition signal 101, and the primary current is blocked. Then, a high secondary voltage is generated on the secondary side of the ignition coil (main) 30a-1, and thus the discharge starts in the ignition plug 33. The secondary voltage causing the discharge is typically about 10 kV to 15 kV, and the secondary current caused by the discharge is within a range of 0.1 A for example. Then, the discharge caused by the energy emission goes on several ms.

In addition, when the timing signal 110 transmitted through the common signal line is turned on at the same time as, or after, the turning-ON of the main ignition signal 101a, the sub ignition signal is turned on by the control circuit, a transistor in an ignitor 301a-2 is switched at a timing when the sub ignition signal is turned on, and a primary current in a range of 5 to 10 A flows to the primary side of the ignition coil (sub) 30a-2.

Therefore, when the magnetic energy is accumulated in the ignition coil (sub) 30a-2, the sub ignition signal is turned off at a timing when the timing signal 110 is turned off, the transistor in the ignitor 301a-2 is switched, the primary current is blocked, a high secondary voltage (not illustrated) is generated on the secondary side of the ignition coil (sub) 30a-2, and the discharge is overlapped in the ignition plug 33. Herein, the OFF timing of the falling edge of the timing signal 110 is set to be the same as the OFF timing of the main ignition signal 101a, or to be delayed by a phase difference $\Delta IGN$ [ms], so that the discharge time can be extended compared to a case where only the ignition coil (main) 30a-1 is used for the ignition.

In addition, if a timing of shifting the ignition control signal 101a and the timing signal 110 from ON to OFF is not appropriately controlled in consideration of a state of the air-fuel mixture in the cylinder and a load stage of the internal combustion engine, ignitionability and a combustion speed may be affected, and variation in a rotation speed and oscillation of the internal combustion engine caused by worsening combustion (worsening ignitionability) may follow. Therefore, the timing is very important since it causes a great influence on the engine performance.

In addition, the control circuit has a function of monitoring the ignition coil (sub) 30a-2, and can detect an abnormality of the ignition coil (sub) 30a-2. In a case where an abnormality is detected, the timing signal 110 is electrically fixed to either LOW (0 V) or HIGH (5 V) in the control circuit, and the ignition coil (sub) is monitored by the control unit 71, so that an abnormality can be detected by the control unit 71.

Further, in this embodiment, the control circuit which outputs the sub ignition signal is provided in the ignition coil (sub) 30a-2, and may be provided in the outer side of the ignition coil (sub) 30a-2, or may be provided in the control unit 71.

Figure 6:
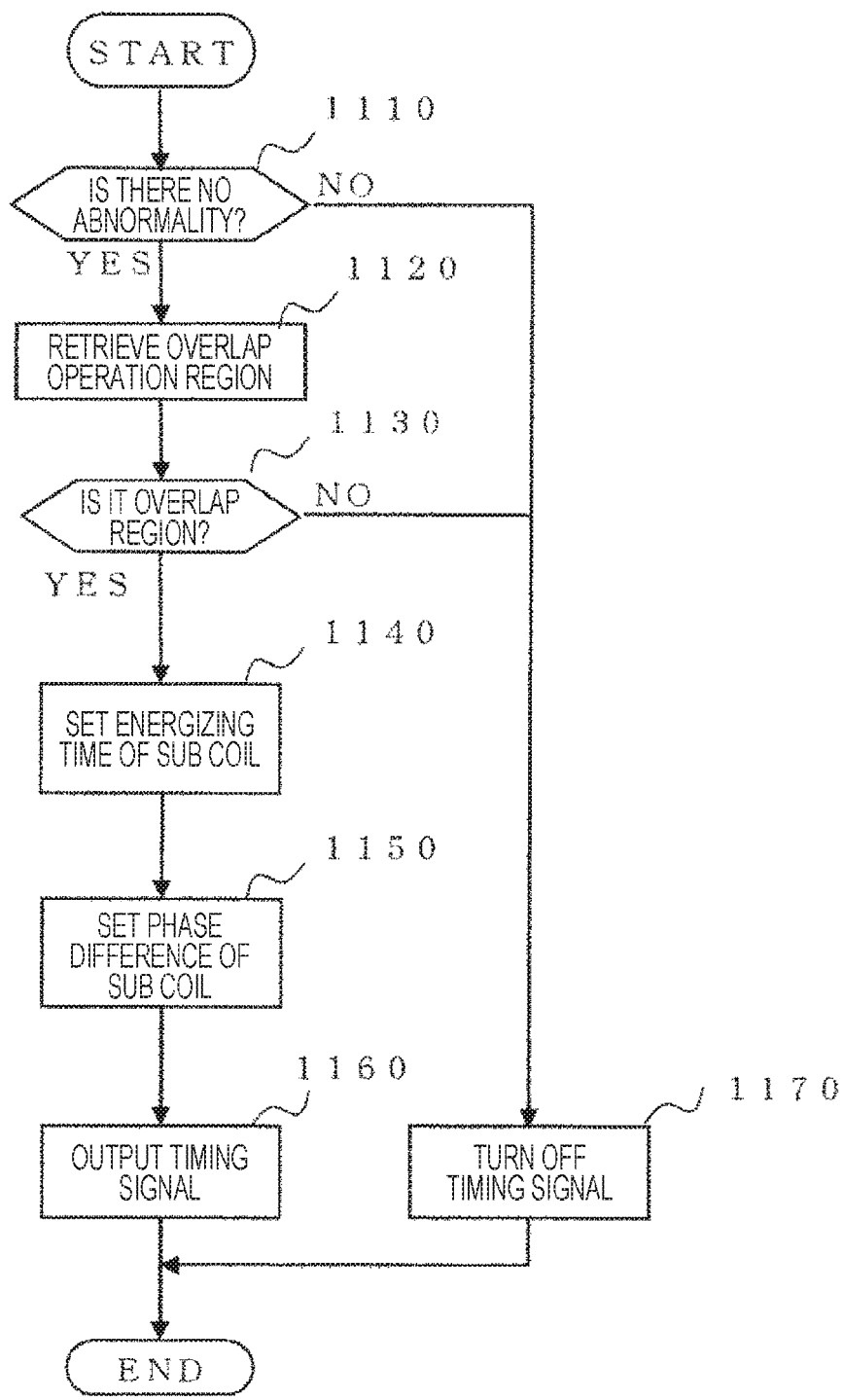
FIG. 6 is a flowchart of setting a timing signal according to the first embodiment.

FIG. 6 is a flowchart illustrating an operational process of a timing signal output performed by a calculation function (the timing signal generation unit 1100 and an overlap operation region determination unit 112) of the control unit 71. For example, the operational process of the timing signal output is performed as an interrupt process based on a predetermined angle synchronized with a crank angle or a timer converted into an angle.

Step 1110 is a step of determining an abnormality in the ignition coil (sub). In a case where an abnormality is detected, the procedure proceeds to step 1170 in which the timing signal is fixed to OFF and the process ends. In a case where an abnormality is not detected, the procedure proceeds to step 1120.

Step 1120 is a step of retrieving an overlap operation region. It is retrieved whether there is a predetermined overlap operation region from the current operation region. In step 1130, in a case where it is determined that the overlap discharge and a typical discharge (that is, the ignition by the ignition coil (sub) is performed or not) is determined and there is no overlap region, the procedure proceeds to step 1170, the timing signal is fixed to OFF, and the process ends. In the case of the overlap region, the procedure proceeds to step 1140.

Figure 7:
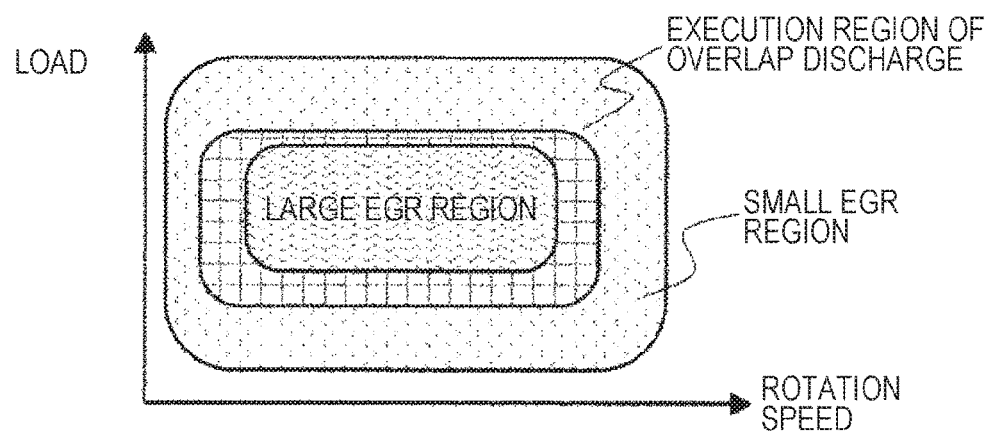
FIG. 7 is a diagram illustrating an overlap discharge region.

Herein, the overlap region retrieving of step 1120 will be described in detail using FIG. 7. FIG. 7 illustrates a relation between an EGR rate and an overlap discharge region when the EGR rate (100%×EGR gas flow rate/New air flow rate) is set according to an engine speed and an engine load in a case where an EGR gas is introduced particularly for the purpose of improving a fuel efficiency.

Herein, on the basis of a combustion stability, it is roughly divided into a "large EGR region" in which the overlap discharge is necessary (for example, the EGR rate exceeds 20%) and a "small EGR region" in which the overlap discharge is not necessary. Further, the execution region of the overlap discharge may be the same as the "large EGR region", but a region in which a rotation speed and a load direction are expanded more than the "large EGR region" is set. Such a configuration is to avoid that the EGR rate set in the "large EGR region" is introduced into the cylinder earlier than the overlap discharge so as to make the combustion worse and to reduce the performance in a case where the operation state shifts from the "small EGR region" to the large EGR region" in a short time. As described above, the execution region of the overlap discharge is set in a microcontroller in the control unit 71 in advance, and it is determined whether it is an operation region of the overlap discharge from the current operation state.

Figure 8:
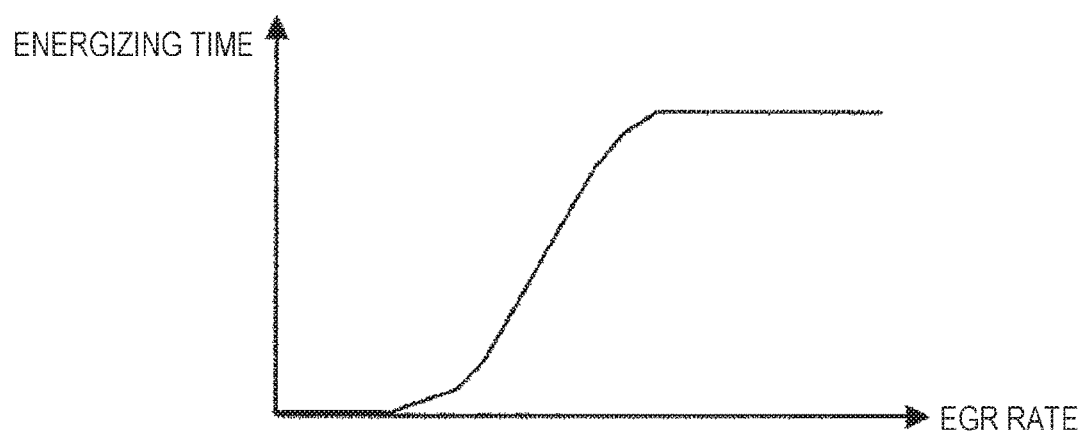
FIG. 8 is a diagram illustrating a setting of an energizing time.

Step 1140 of FIG. 6 is a step of setting an energizing time of the ignition coil (sub). The energizing time of the ignition coil (sub) is set in the microcontroller in the control unit 71 in advance. For example, as illustrated in FIG. 8, the energizing time may be set to be longer as the EGR rate becomes large.

Figure 9:
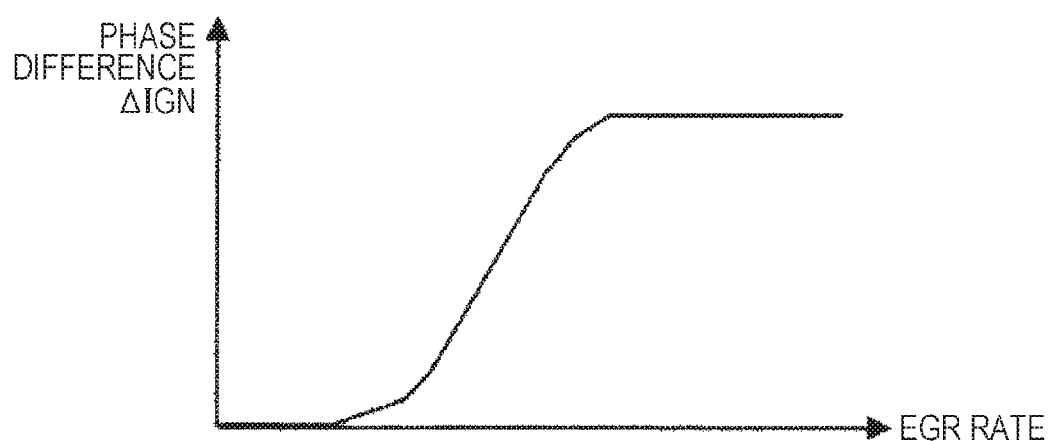
FIG. 9 is a diagram illustrating a setting of a phase difference time

Step 1150 of FIG. 6 is a step of setting a phase difference of the ignition coil (sub). In step 1150, a phase difference [ms] in the ignition timing of the ignition coil (main) is set. The phase difference of the ignition coil (sub) is set in the microcontroller in the control unit 71 in advance. For example, as illustrated in FIG. 9, the phase difference may be set to be larger as the EGR rate becomes large. The timing signal is output in step 1160 according to the energizing time and the phase difference which are set in step 1140 and step 1150.

Figure 10:
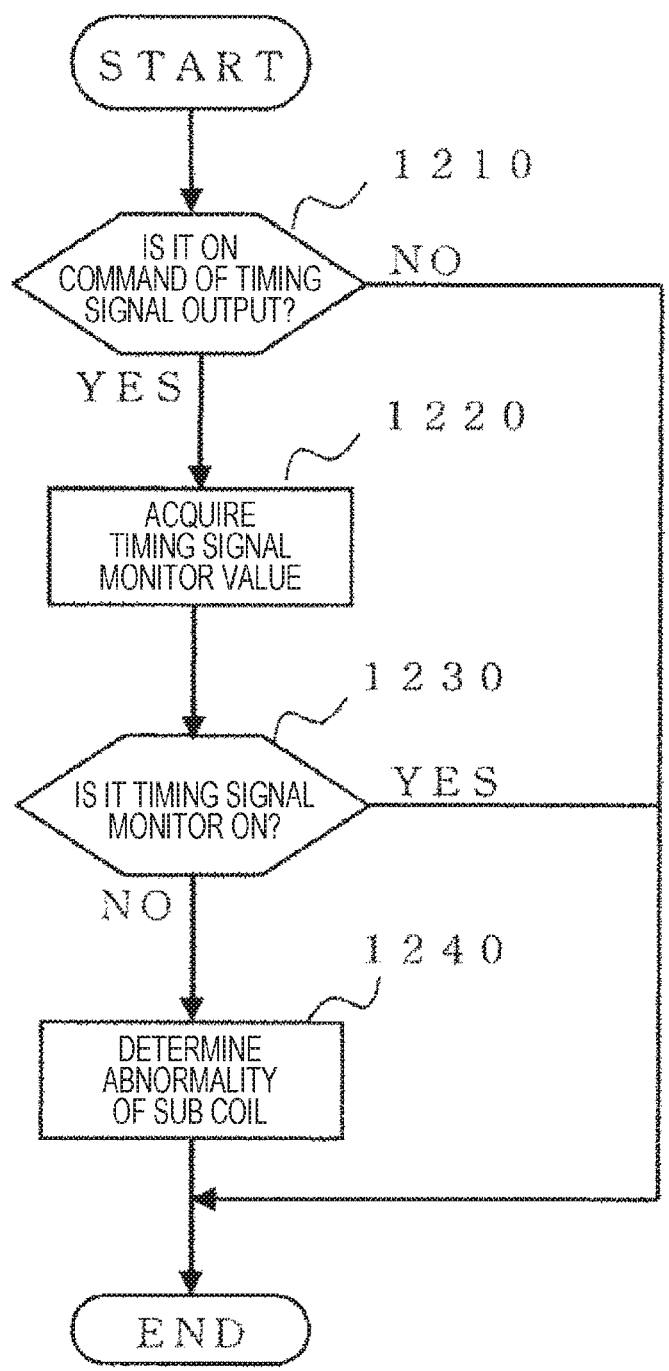
FIG. 10 is a flowchart of an abnormality detection according to the first embodiment.

Next, the details of the abnormality detection of step 1110 of FIG. 6 will be described using FIG. 10. FIG. 10 is a flowchart of the abnormality detection of step 1110 of FIG. 6 which is periodically performed by the control unit 71.

Step 1210 of FIG. 10 is a step of determining whether the timing signal output is an ON command. In a case where it is determined that the timing signal output is the ON command from FIG. 6, the procedure proceeds to step 1220. In a case where the timing signal is an OFF signal, this process ends.

Step 1220 is a step of acquiring a monitor value of the timing signal. As illustrated in FIG. 2, the timing signal 110 is input to the CPU 78 at the same time of being output, and acquired as the timing signal monitor value.

Step 1230 is a step of determining whether the timing signal monitor value acquired in step 1220 is an ON value. In a case where the timing signal monitor value is an ON value (that is, the timing signal output is the ON command, and the monitor value at that time is also the ON value), it is determined as normal, and the process ends. In a case where the timing signal monitor value is an OFF value (that is, the timing signal monitor value becomes the OFF value even though the timing signal output is the ON command), the procedure proceeds to step 1240, and it is determined that the sub coil is abnormal.

Figure 11:
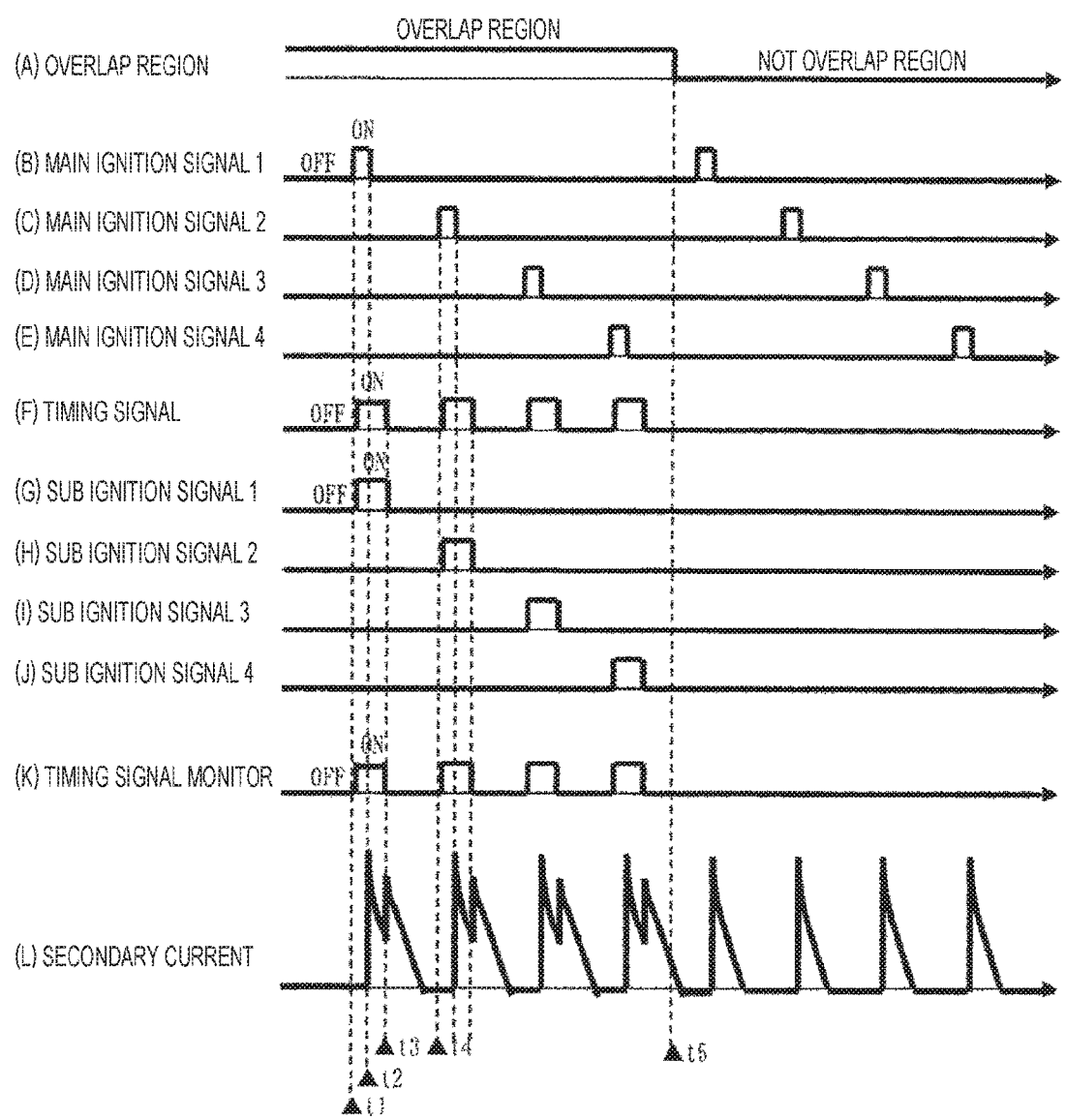
FIG. 11 is a timing chart at a normal time of the ignition control device according to the first embodiment.

Next, the description will be given using a timing chart of FIG. 11 about a case where the ignition coil (sub) is normal. A period from Time t1 to Time t5 illustrates an operation in the overlap region. At Time t1, a main ignition signal 1 is turned on, and the ignition coil (main) starts to be energized. When the timing signal is turned on between Time t1 and Time t2, a sub ignition signal 1 is turned on, and the ignition coil (main) starts to be energized. The timing signal is kept on until the energizing time previously set in step 1140 of FIG. 6 elapses. When the main ignition signal 1 is turned off according to the ignition timing previously set at Time t2, the ignition coil (main) starts to discharge, and the secondary current rises. When a time from Time t2 passes a phase difference time set at step 1150 of FIG. 6, the timing signal is turned off at Time t3. The ignition coil (sub) starts to discharge at a timing when the sub ignition signal 1 is turned off. The discharge of the ignition coil (sub) is overlapped with the discharge of the ignition coil (main). Therefore, the secondary current rises again.

The ignition of each cylinder is repeatedly performed until Time t5. When it is determined that it is not an overlap region at Time t5, the timing signal is fixed to OFF and the sub ignition signals of all cylinders are turned off. Therefore, only the secondary current of the ignition coil (main) remains. Further, since the ignition coil (sub) of FIG. 11 is normal, the timing signal and the timing signal monitor are identically operated.

Figure 12:
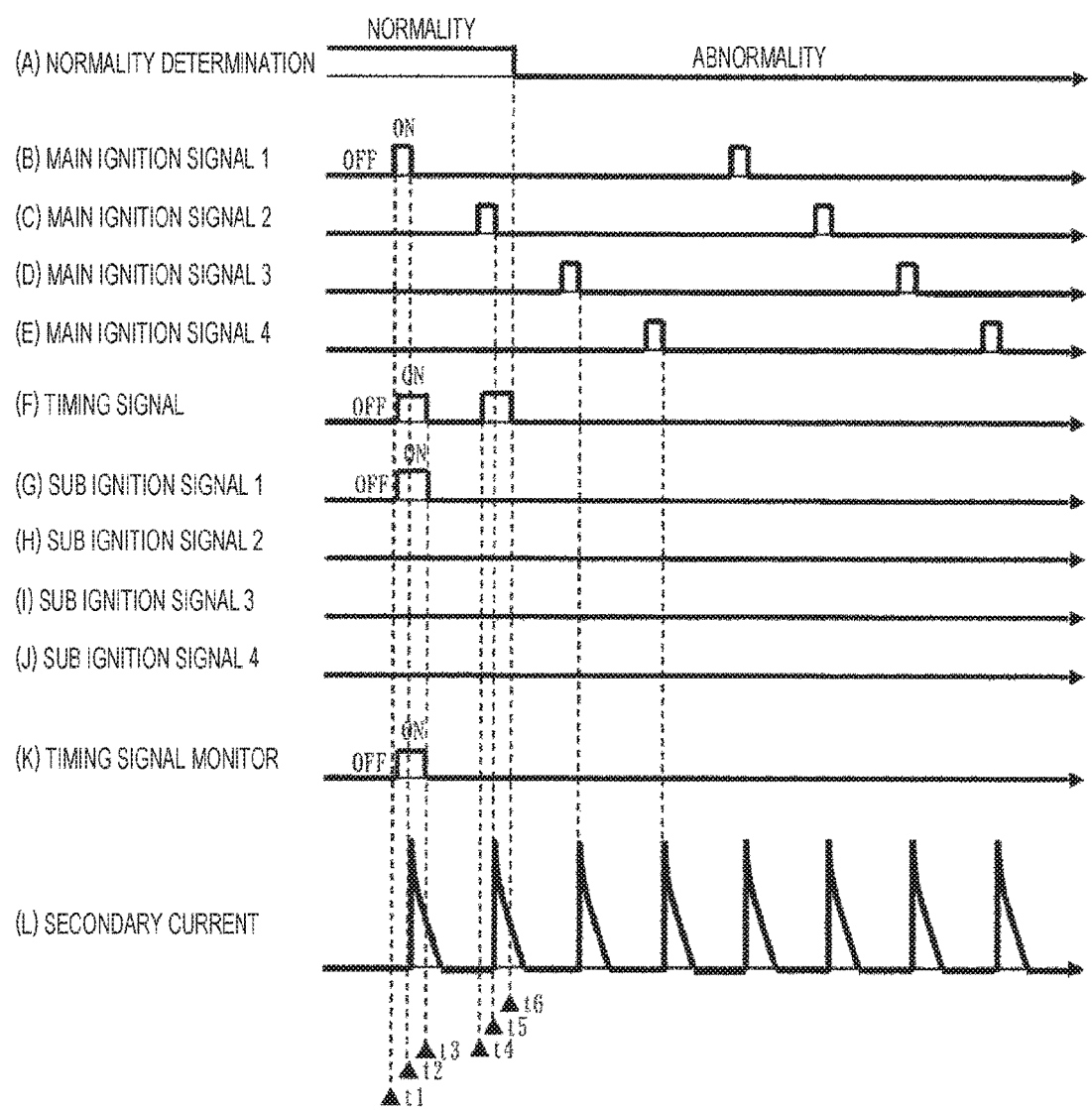
FIG. 12 is a timing chart at a time when the ignition control device according to the first embodiment detects an abnormality.

Next, the description will be given using a timing chart of FIG. 12 about a case where the ignition coil (sub) is abnormal. At Time t1, the main ignition signal 1 is turned on, and the ignition coil (main) starts to be energized. Since Time t1 is the overlap region, the sub ignition signal 1 is turned on and the ignition coil (main) starts to be energized when the timing signal is turned on between Time t1 and Time t2. When the main ignition signal 1 is turned off according to the ignition timing previously set at Time t2, the ignition coil (main) starts to discharge, and the secondary current rises. When a time from Time t2 passes a phase difference time set at step 1150 of FIG. 6, the timing signal is turned off at Time t3. The ignition coil (sub) starts to discharge at a timing when the sub ignition signal 1 is turned off. However, the secondary current does not rise because there is an abnormality in the ignition coil (sub), and it is not possible to detect the rising of the secondary current. Therefore, an abnormality is detected by the control circuit provided in the ignition coil (sub) of FIG. 4, and the timing signal is fixed to OFF. A main ignition signal 2 is turned on at Time t4, and the same operation as that at Times t1, t2, and t3 is performed. However, since the timing signal is fixed to OFF by the control circuit, a sub ignition signal 2 is not turned on and the timing signal monitor value is also not turned on. When an abnormality of the sub coil in step 1240 of FIG. 10 is detected at Time t6, it is out of the overlap region, and then the timing signal is fixed to OFF.

With the configuration described above, the ignition system is equipped with the ignition energy supply units of two systems for every cylinder. The ignition energy supply units of two systems can be controlled only by adding one signal line compared to an ignition system equipped only with the ignition energy supply units of one system. Even in the case of a multiple-cylinder internal combustion engine, it is possible to provide an engine control device which can suppress a shortage of output terminals of the control unit and an increase of costs.

Second Embodiment

Figure 13:
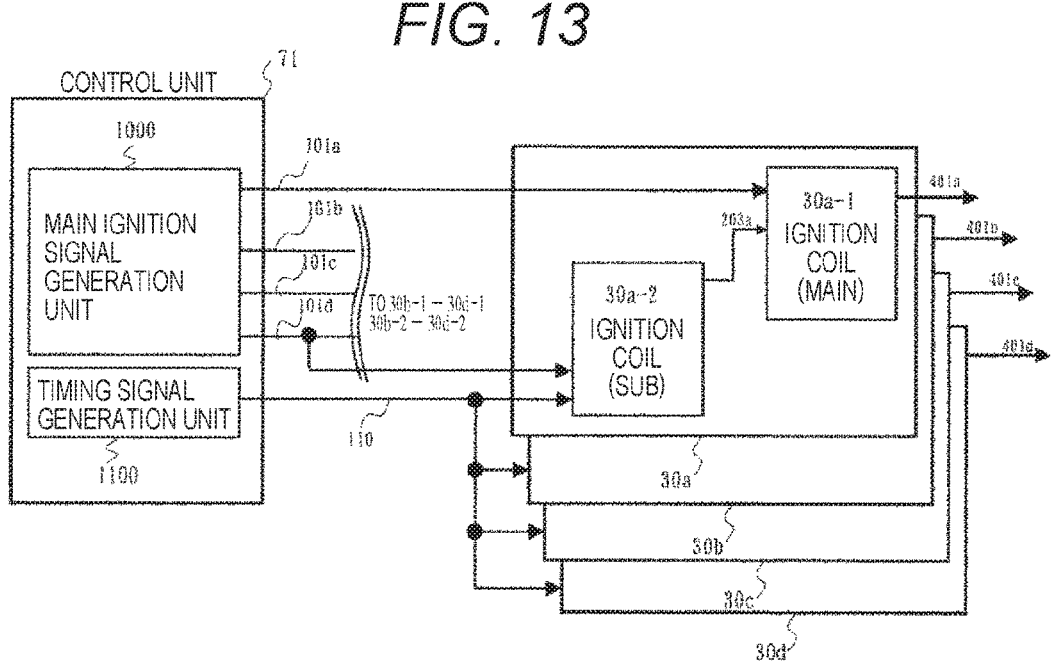
FIG. 13 is a diagram illustrating a configuration of an engine control system according to a second embodiment.

Next, a second embodiment of the invention will be described using FIGS. 13 to 15. The second embodiment is different from the first embodiment in that the main ignition signal which is input to the ignition coil (sub) 30a-2 is not the main ignition signal 101a belonging to the same cylinder but the main ignition signal 101d belonging to a cylinder different from that of the ignition coil (sub) 30a-2 as illustrated in FIG. 13.

Next, the details will be described using FIGS. 14 and 15. FIG. 14 is a diagram illustrating a detailed connection between the ignition coil (main) 30a-1 and the ignition coil (sub) 30a-2. The ignition coil (main) 30a-1 is configured by an ignitor, a primary coil, and a secondary coil. The main ignition signal 101a output from the control unit 71 is input to the ignitor, and the current of the primary coil is controlled by the main ignition signal 101a, so that the ignition of the ignition plug 33 is performed.

The ignition coil (sub) 30a-2 is configured by an ignitor, a primary coil, a secondary coil, and a control circuit. The control circuit receives the main ignition signal 101d which is an ignition signal of the ignition energy supply units of the other side belonging to a cylinder different from that of the ignition coil (sub) 30a-2 and the timing signal 110. At this time, the control circuit determines whether the cylinder is an ignition cylinder using the ignition signal of the ignition energy supply units of the other side, and generates a sub ignition signal with respect to the ignition coil (sub) 30a-2 according to the energizing time commanded by the timing signal.

The current generated in the secondary coil is controlled by controlling the current of the primary coil using the sub ignition signal output from the control circuit. The upstream side of the secondary coil of the ignition coil (sub) 30a-2 is connected to the downstream side of the secondary coil of the ignition coil (main) 30a-1, and the secondary coil of the ignition coil (main) 30a-1 and the secondary coil of the ignition coil (sub) 30a-2 are connected in series with respect to the ignition plug 33.

Herein, a main ignition signal belonging to a cylinder which is used for the ignition right before the main ignition signal 101a is preferably used as the main ignition signal 101d which is an ignition signal of the ignition energy supply units of the other side belonging to a cylinder different from that of the ignition coil (sub) 30a-2. For example, in a case where an ignition order of a 4-cylinder engine is a first cylinder, a third cylinder, a fourth cylinder, and a second cylinder, the second cylinder is right before the first cylinder. Therefore, the main ignition signal to be input to the control circuit of the ignition coil (sub) belonging to the first cylinder is preferably the main ignition signal of the second cylinder.

Figure 14:
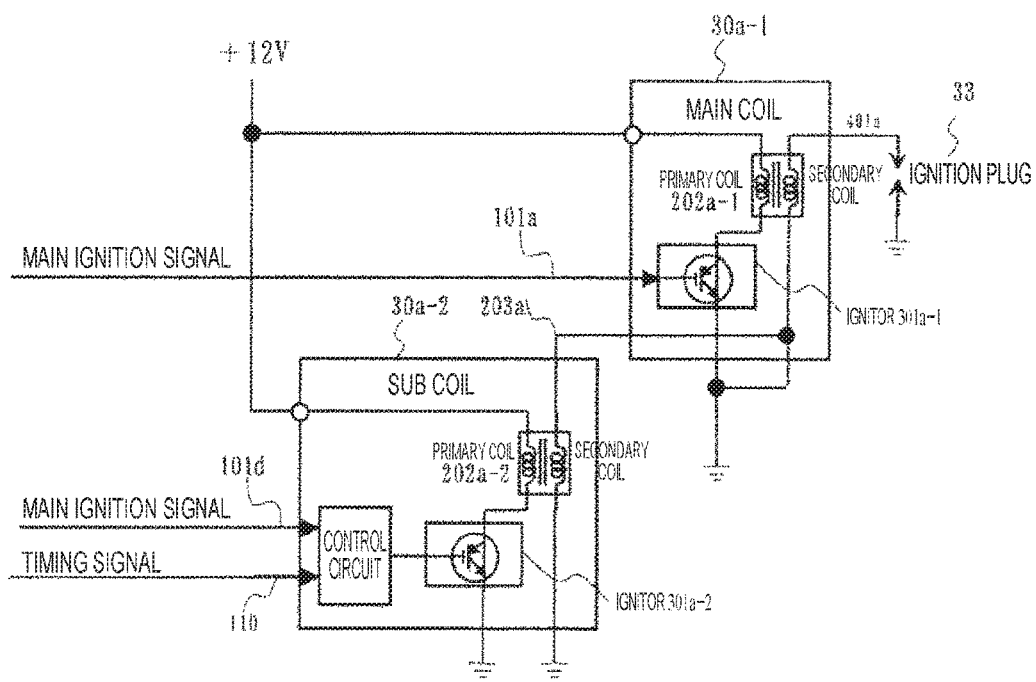
FIG. 14 is a diagram for describing an ignition control device according to the second embodiment.
Figure 15:
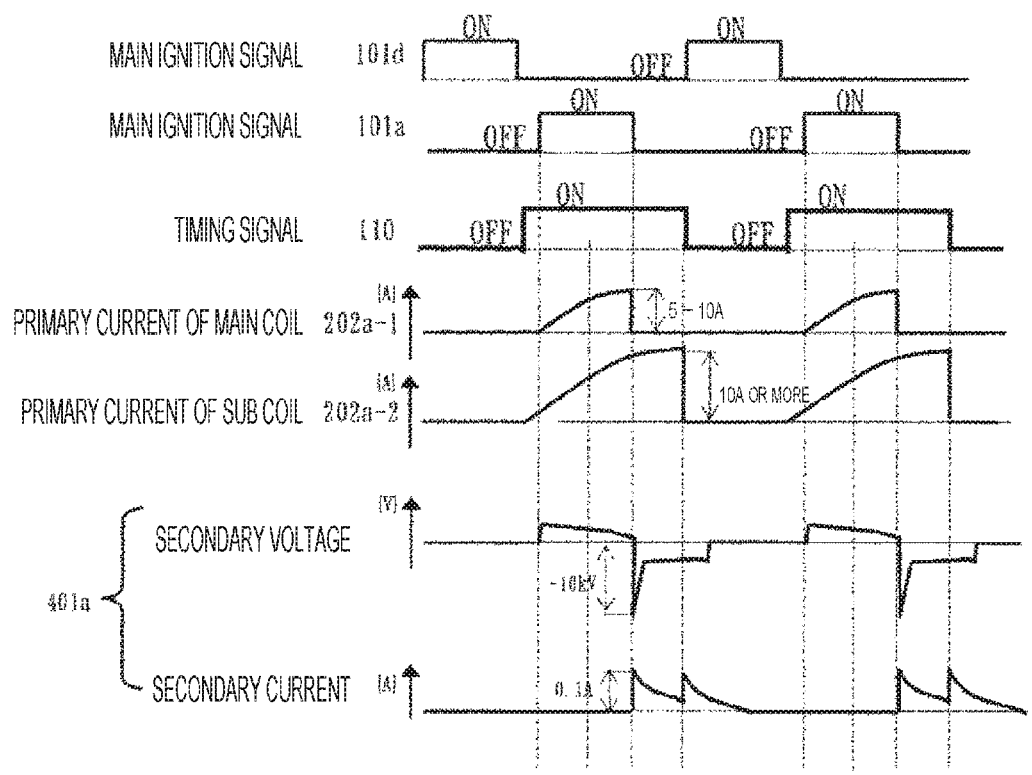
FIG. 15 is a timing chart of the ignition control device according to the second embodiment.

FIG. 15 is a timing chart illustrating waveforms of the input/output of the coil 30 configured as illustrated in FIG. 14. Herein, there is illustrated a relation among the main ignition control signal 101, a primary current with respect to the timing signal 110, and a discharge output (a secondary voltage and a secondary current) 401 in the coil 30 in a case where the air-fuel mixture compressed in one cylinder of the internal combustion engine ignites.

This embodiment is different from the timing chart of FIG. 5 in that the timing of turning on the timing signal 110 occurs before the main ignition signal 101a. Specifically, the control circuit illustrated in FIG. 14 determines an ignition cylinder on the basis of the main ignition signal 101d belonging to the cylinder which is subjected to the ignition right before. Therefore, it is possible to determine an ignition cylinder before the main ignition signal 101a, so that the timing of turning on the timing signal 101 is set before the main ignition signal 101a. With such a configuration, the ON time of the timing signal (that is, the energizing time of the ignition coil (sub)) can be made longer than that of the method illustrated in FIGS. 4 and 5.

With the configuration described above, the ignition system equipped with the ignition energy supply units of two systems for every cylinder can control the ignition energy supply units of two systems only by adding one common signal line compared to the ignition system only equipped with the ignition energy supply units of one system. Even in the case of a multiple-cylinder internal combustion engine, it is possible to provide an engine control device which can suppress a shortage of output terminals of the control unit and an increase of costs.

Third Embodiment

Figure 16:
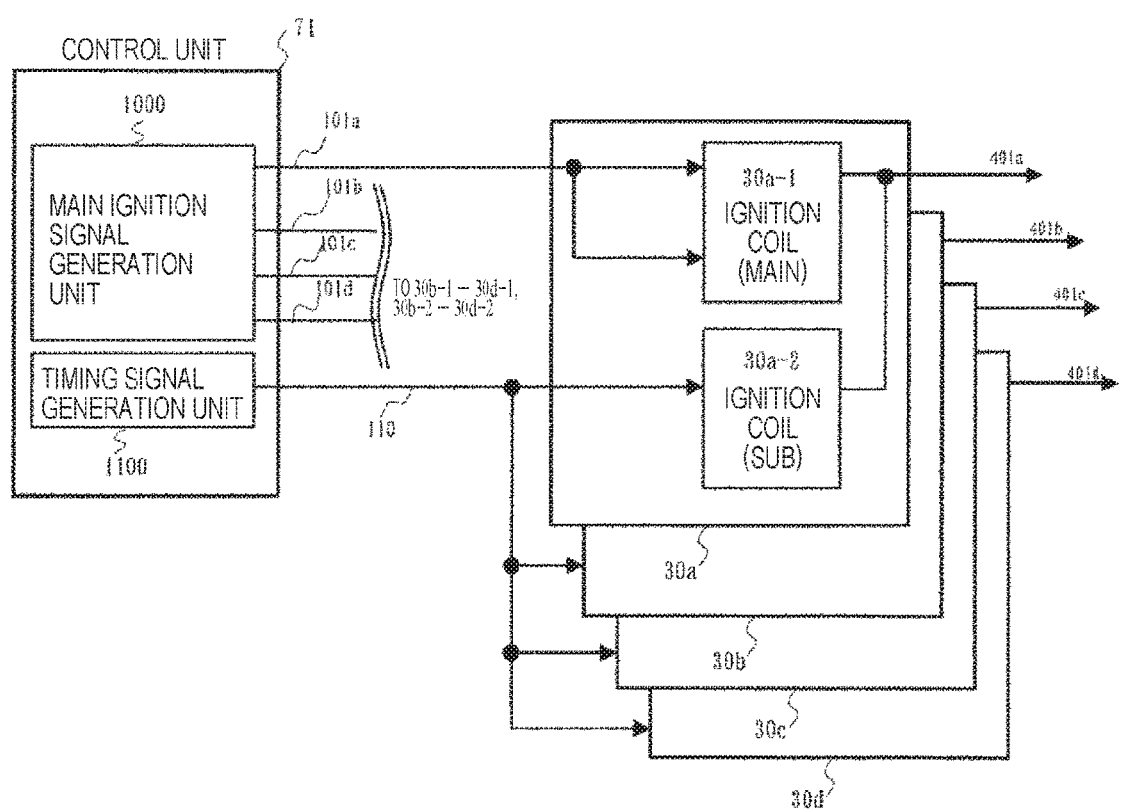
FIG. 16 is a diagram illustrating a configuration of an engine control system according to a third embodiment.

Next, a third embodiment of the invention will be described using FIGS. 16 to 18. The third embodiment is different from the first embodiment in that the ignition coil (main) 30a-1 and the ignition coil (sub) 30a-2 are connected in parallel as illustrated in FIG. 16.

Next, the details will be described using FIGS. 17 and 18. FIG. 17 is a diagram illustrating a detailed connection between the ignition coil (main) 30*a*-1 and the ignition coil (sub) 30*a*-2. The ignition coil (main) 30*a*-1 is configured by an ignitor, a primary coil, and a secondary coil. The main ignition signal 101*a* output from the control unit 71 is input to the ignitor, and the current of the primary coil is controlled by the main ignition signal 101*a*, so that the ignition of the ignition plug 33 is performed.

The ignition coil (sub) 30*a*-2 is configured by an ignitor, a primary coil, a secondary coil, and a control circuit. The control circuit receives the main ignition signal 101*a* which is an ignition signal of the ignition energy supply units of the other side belonging to the same cylinder as that of the ignition coil (sub) 30*a*-2 and the timing signal 110. At this time, the control circuit determines whether the cylinder is an ignition cylinder using the ignition signal of the ignition energy supply units of the other side, and generates a sub ignition signal with respect to the ignition coil (sub) 30*a*-2 according to the energizing time commanded by the timing signal. The current generated in the secondary coil is controlled by controlling the current of the primary coil using the sub ignition signal output from the control circuit.

The upstream side of the secondary coil of the ignition coil (sub) 30*a*-2 is connected to the upstream side of the secondary coil of the ignition coil (main) 30*a*-1, and the secondary coil of the ignition coil (main) 30*a*-1 and the secondary coil of the ignition coil (sub) 30*a*-2 are connected in parallel with respect to the ignition plug 33.

Further, the main ignition signal which is input for the control circuit to determine an ignition cylinder may be the main ignition signal 101*d* which is an ignition signal of the ignition energy supply units of the other side belonging to a different cylinder as illustrated in FIG. 14, and the main ignition signal belonging to a cylinder subjected to the ignition right before the main ignition signal 101*a* is preferably used.

Figure 17:
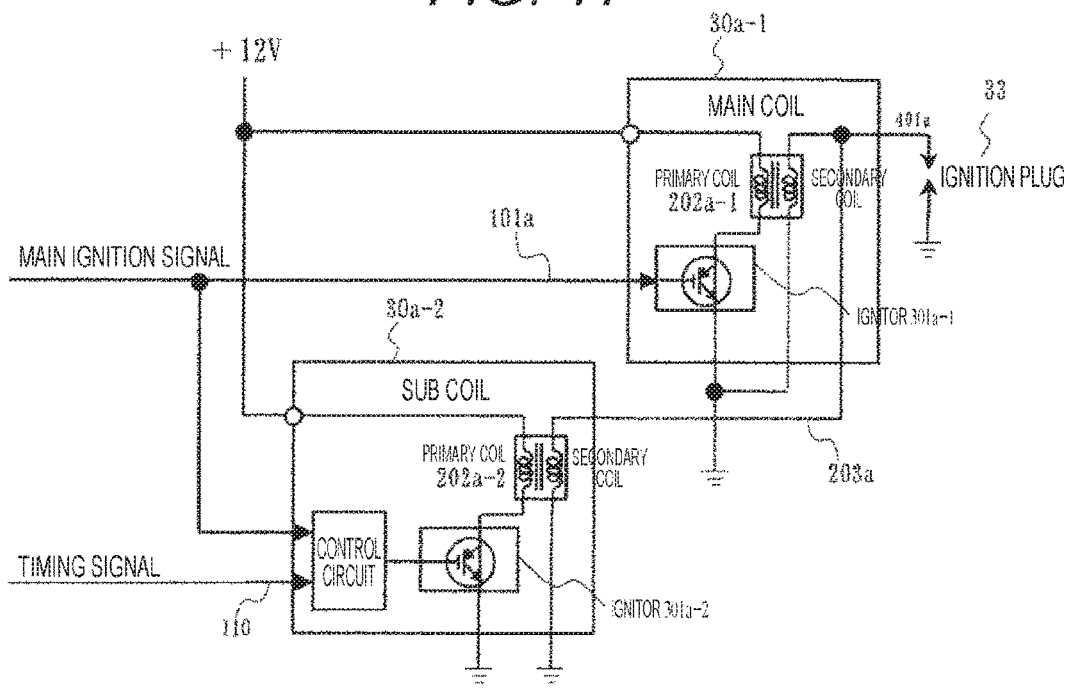
FIG. 17 is a diagram for describing an ignition control device according to the third embodiment.
Figure 18:
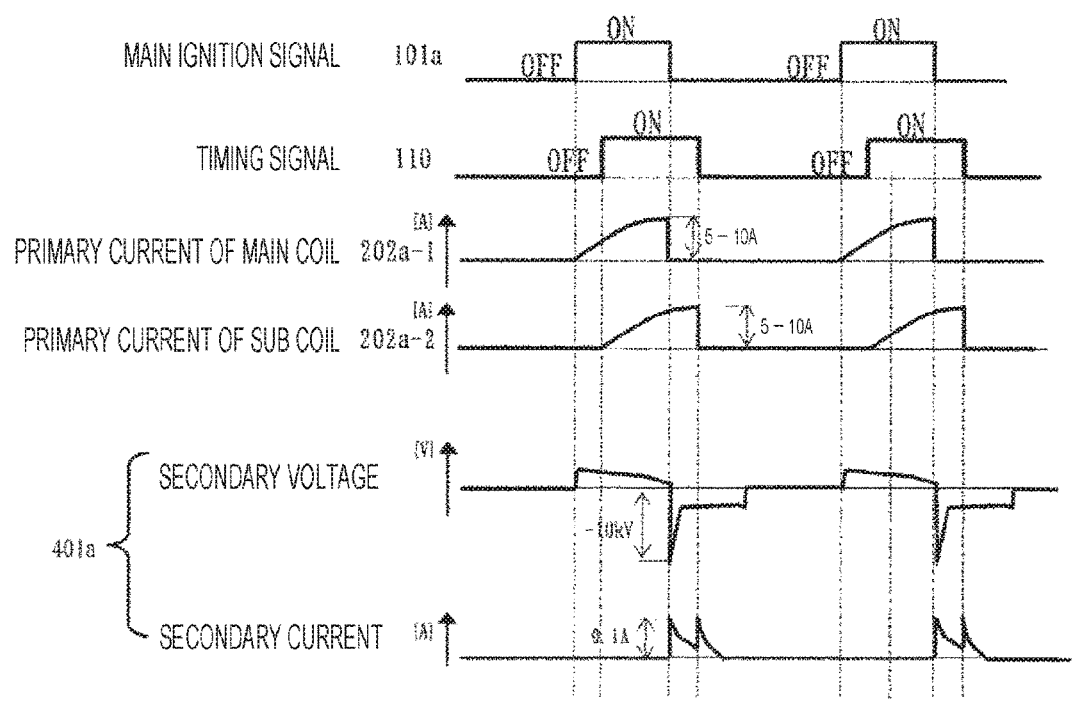
FIG. 18 is a timing chart of the ignition control device according to the third embodiment.

FIG. 18 is a timing chart illustrating waveforms of the input/output of the coil 30 configured as illustrated in FIG. 17. Herein, there is illustrated a relation among the main ignition control signal 101, the primary currents with respect to the timing signal 110, and the discharge output (the secondary voltage and the secondary current) 401 in the coil 30 in a case where the air-fuel mixture compressed in one cylinder of the internal combustion engine ignites. In this case, the operation of the timing signal 110 and the operation of the primary current with respect to the timing signal 110 are the same as those of FIG. 5, but the discharge time of the secondary current becomes short compared to the discharge time of FIG. 5. This is because the parallel connection between the ignition coil (main) and the ignition coil (sub) causes an inductance of the discharge path to be reduced compared to the series connection.

With the configuration described above, the ignition system equipped with the ignition energy supply units of two systems for every cylinder can control the ignition energy supply units of two systems only by adding one common signal line compared to the ignition system only equipped with the ignition energy supply units of one system. Even in the case of a multiple-cylinder internal combustion engine, it is possible to provide an engine control device which can suppress a shortage of output terminals of the control unit and an increase of costs.

Further, in a case where a method of improving fuel efficiency by introducing a large amount of EGR gas is employed, an appropriate ratio of the air-fuel mixture about the ignition plug is reduced. Therefore, a method of extending the discharge time is employed using the series connection of the coils. In a case where there is a need to make the flow about the ignition plug faster and to supply ignition energy in a short time, the parallel connection of the coils may be employed. In addition, there may be employed a method of switching the series and parallel connections according to an engine stage.

Fourth Embodiment

Figure 19:
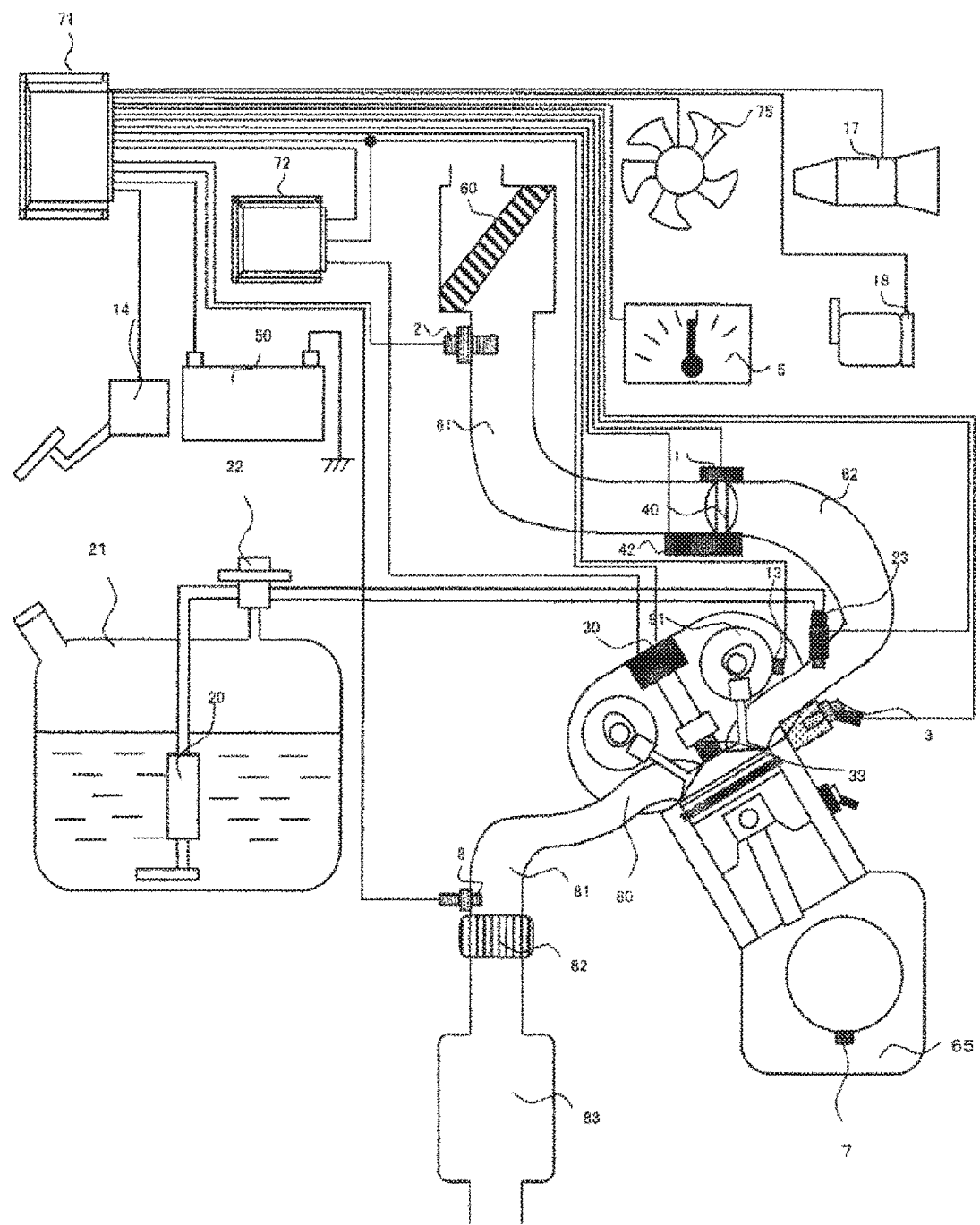
FIG. 19 is a diagram illustrating a configuration of an engine control system according to a fourth embodiment of the invention.

Next, a fourth embodiment of the invention will be described using FIGS. 19 to 22. The fourth embodiment is different from the first embodiment in that a discharge unit 72 is provided between the control unit 71 and the ignition coil 30 as illustrated in FIG. 19. The discharge unit 72 detects the timing signal which is output from the control unit 71. When the ignition timing is detected from the ignition signal, a predetermined voltage (for example, 500 V) or more is added to the discharge current of the ignition coil 30 from a boosting circuit.

Figure 20:
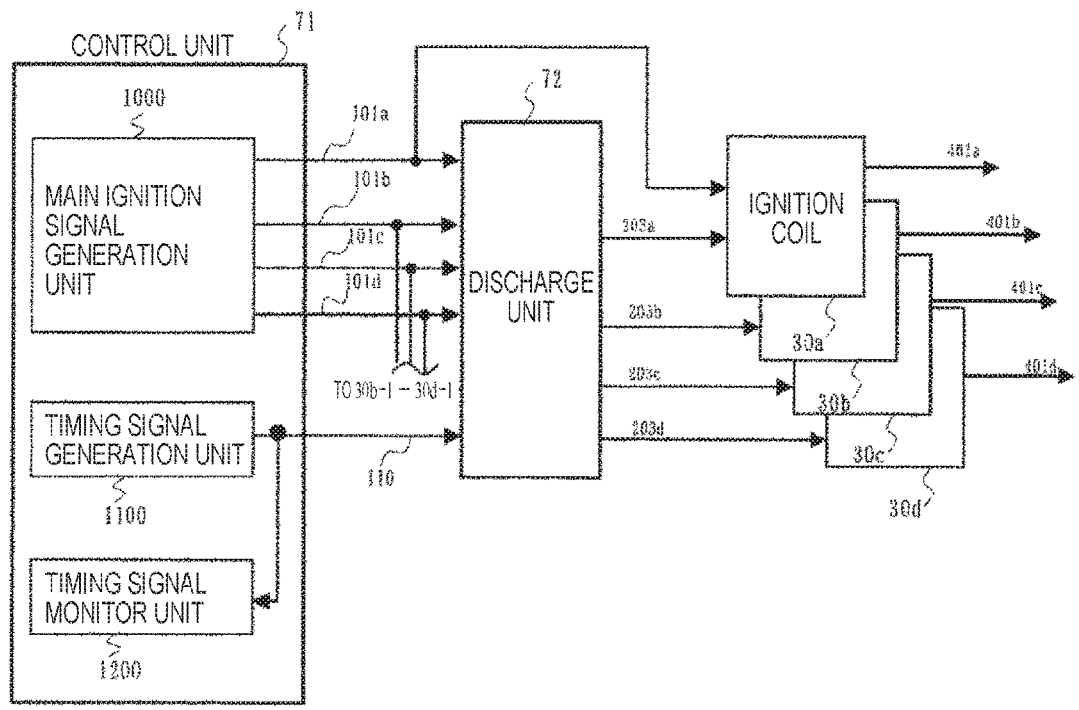
FIG. 20 is a diagram illustrating a configuration of the engine control system according to the fourth embodiment of the invention.

Next, the details will be described using FIG. 20. FIG. 20 illustrates a four-cylinder engine (internal combustion engine) as an example of the engine control device according to this embodiment. First, the ignition signals 101*a* to 101*d* for the respective cylinders are output from the main ignition signal generation unit 1000 mounted in the control unit 71 to the ignition signal 101. In addition, the timing signal 110 is output from the timing signal generation unit 1100.

The discharge unit 72 is provided separately from the control unit 71, and a boosting circuit 203 and the ignition coils 30*a* to 30*d* for the cylinders are connected by high voltage lines 203*a* to 203*d* (about 500 V). When the discharge starts at a typical ignition timing with respect to a target cylinder by switching the ignitors (301*a* to 301*d*) built in the respective ignition coils (30*a* to 30*d*), a current value required for the high voltage lines (203*a* to 203*d*) to keep the discharge state is supplied to the secondary coil. The engine cylinder is configured such that the discharge is caused by the ignition plugs (33*a* to 33*d*) to make the air-fuel mixture ignite and a typical discharge is kept on (so-called overlap discharge). In addition, the respective portions are connected by a wire harness.

Herein, the discharge unit 72 is configured by a control circuit 202 which controls a discharge time on the basis of information from the timing signal 110, a cylinder determination circuit 201 which determines an ignition timing of each cylinder, and the boosting circuit 203. When the ignition signals 101*a* to 101*d* for the cylinders and the high voltage lines 203*a* to 203*d* required for the overlap discharge are supplied to the secondary coil of the ignition coil corresponding to the respective cylinders in synchronization with the timing of the timing signal 110, the overlap discharge can be generated.

Figure 21:
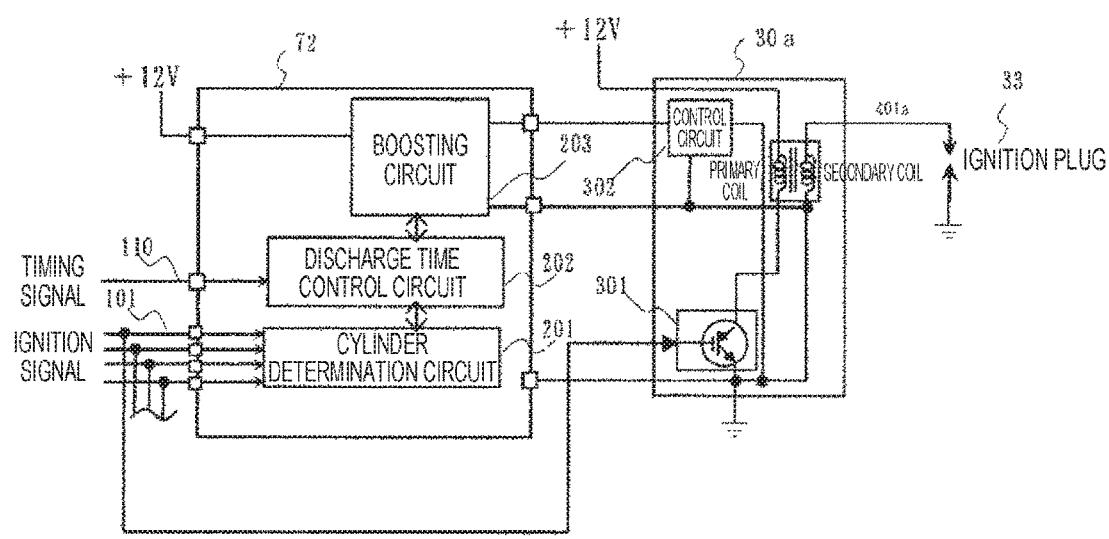
FIG. 21 is a diagram for describing an ignition control device according to the fourth embodiment.
Figure 22:
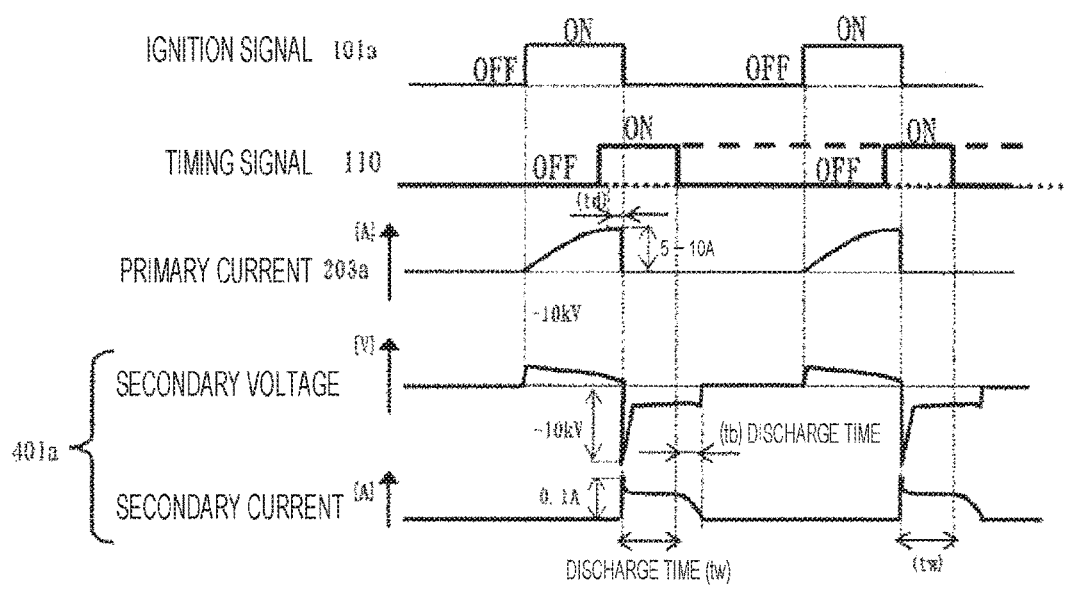
FIG. 22 is a timing chart of the ignition control device according to the fourth embodiment.

FIG. 21 illustrates one representative cylinder configured by the ignition signal control 101*a*, an overlap request signal 110, the discharge unit 72, and the ignition coil 30*a* for each cylinder in a case where the overlap discharge is performed in this embodiment. FIG. 22 illustrates each situation of the primary current, the secondary current and voltage of the ignition coil in a case where the air-fuel mixture compressed in the cylinder of the internal combustion engine ignites.

When the primary current is blocked by switching the ignitor 301 at a timing of turning on the output from the ignition signal 101*a*, a high voltage (secondary voltage) is generated in the secondary coil and the discharge starts in the ignition plug. The discharge time control circuit 202 receives information of an input signal of the timing signal 110 to determine a time to perform the overlap discharge. The cylinder determination circuit 201 which determines an ignition timing of a target cylinder determines the target cylinder to which the boosting circuit 203 is performed by the ignition signal 101a. The high voltage line 203a required for the overlap discharge is connected to the secondary coil of the ignition coil 30a corresponding to the target cylinder in synchronization with timing of blocking the primary current so as to supply a high voltage in conjunction with a control circuit 302 in the ignition coil. Therefore, the overlap discharge can occur. The boosting circuit is blocked at a timing when the discharge time control circuit 202 ends the overlap discharge so as to end the overlap discharge.

The secondary current and the secondary voltage illustrated in FIG. 22 are extended during the discharge time (tw) and the discharge voltage is continuously supplied during that time. Therefore, the ignition performance to the air-fuel mixture in the cylinder can be improved.

In addition, the overlap request signal 110 illustrated in FIG. 22 is controlled to output the ON signal at a timing earlier by time (td) with respect to the falling edge of the ignition signal as depicted by a solid line. This is because a calculation timing of the overlap request signal is not necessarily calculated at an ignition timing, but the calculation may be performed at a predetermined calculation timing of a microcontroller (for example, every 10 ms) and, while depending on a determination timing of the discharge time control circuit 202, the discharge time control circuit is able to determine information of an overlap request and information of an overlap time at a timing as early as possible when the information of the overlap request is surely output. At least (td) is preferably the same timing as a timing when the ignition signal control is turned off (td=0) or before that timing.

In the embodiment, the information of the discharge time (tw) is set to be ON/OFF output at every ignition timing in synchronization with the timing signal. As another method, the timing signal 110 may simply output an ON signal as illustrated by a broken line (that is, only information of overlap discharge ON/OFF) in a case where the control of the discharge time is independently controlled (for example, a fixed time) by the overlap control circuit 202. Further, in the case of the overlap discharge OFF mode, information indicating always OFF depicted by a dotted line is output.

With the configuration described above, the ignition system equipped with the ignition energy supply units of two systems for every cylinder can control the ignition energy supply units of two systems only by adding one common signal line compared to the ignition system only equipped with the ignition energy supply units of one system. Even in the case of a multiple-cylinder internal combustion engine, it is possible to provide an engine control device which can suppress a shortage of output terminals of the control unit and an increase of costs.

Fifth Embodiment

Figure 23:
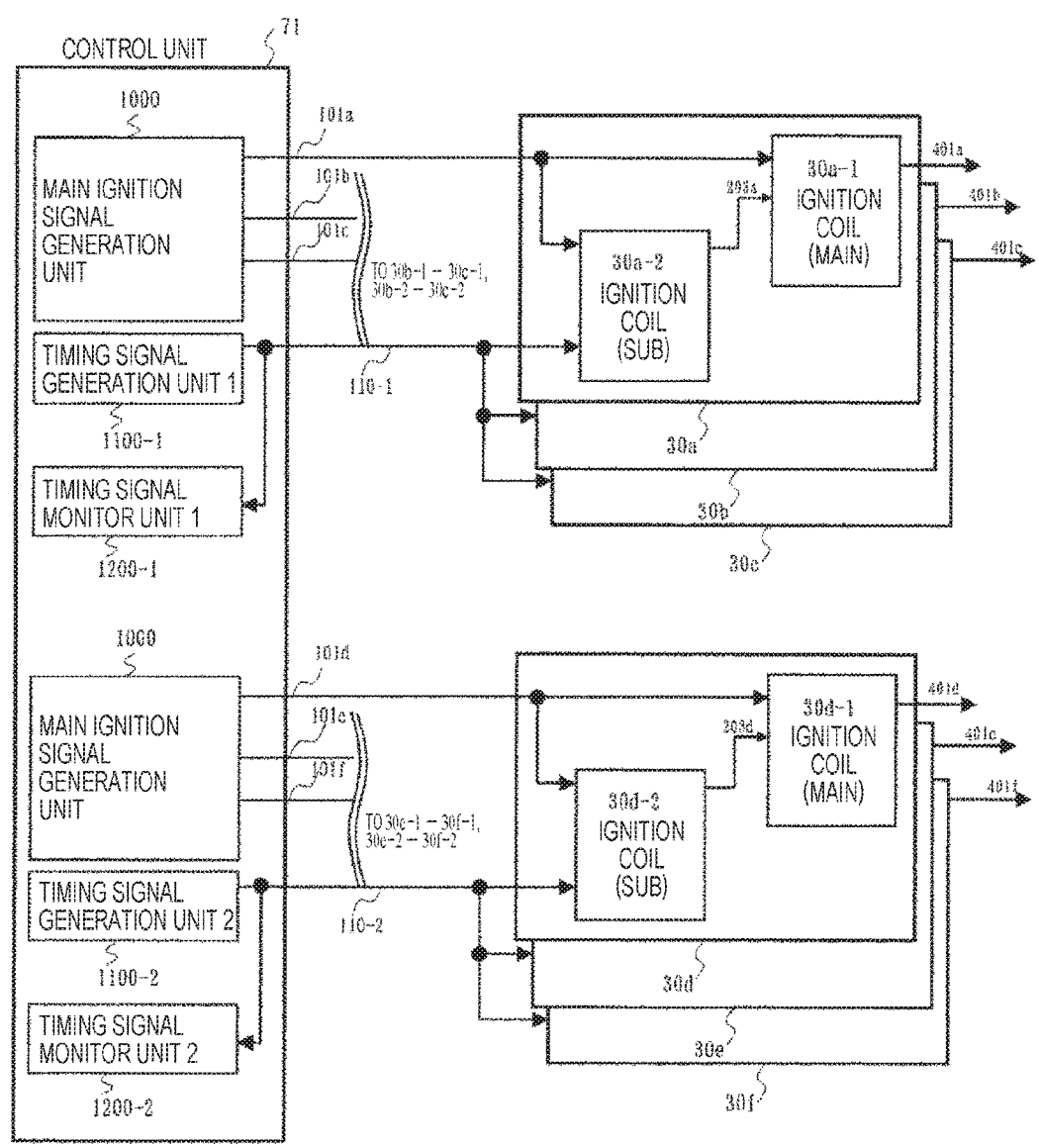
FIG. 23 is a diagram illustrating a configuration of the engine control system according to the fourth embodiment of the invention.

Next, a fifth embodiment of the invention will be described using FIG. 23.

The fifth embodiment is an example where a 6-cylinder internal combustion engine is employed. The first embodiment is different from the fourth embodiment in that the timing signal generation unit is configured by two units such as a timing signal generation unit 1 and a timing signal generation unit 2 and there are two timing signals. One of the timing signals is connected to the control unit, and the other one is branched in the middle thereof. The timing signals are each connected to the plurality of ignition coils.

With the configuration described above, even in the case of a multiple-cylinder internal combustion engine, it is possible to provide an engine control device which can suppress a shortage of output terminals of the control unit and an increase of costs.

Hitherto, the description has been given about five embodiments, but the contents do not depend on these embodiments. The invention may be applied to an ignition system which includes the ignition energy supply units of two systems for every cylinder. For example, the invention may be applied to an ignition system which includes two sets of the ignition plugs and the ignition coils for every cylinder.

REFERENCE SIGNS LIST 1 throttle sensor
2 air flow sensor
3 water temperature sensor
7 crank angle sensor
14 accelerator sensor
17 neutral switch
18 air condition switch
19 auxiliary load switch
23 injector
30 ignition coil
42 throttle drive motor

The invention claimed is:

1. An engine control device which controls a multiple-cylinder engine in which ignition energy supply units of two systems are provided for every cylinder,
wherein a signal is transmitted through a common signal line to a plurality of ignition energy supply units of one system among the ignition energy supply units of the two systems to control the ignition energy supply units of the one system.

2. The engine control device according to claim 1,
wherein the ignition energy supply units of the two systems are configured to overlap a discharge of the ignition energy supply units of the one system and a discharge of the ignition energy supply units of the other system to be output.

3. The engine control device according to claim 1,
wherein the plurality of ignition energy supply units having received a signal through the common signal line determine an ignition cylinder using an ignition signal of the ignition energy supply units of the other system.

4. The engine control device according to claim 3,
wherein the ignition signal of the ignition energy supply units of the other system to be used for determining the ignition cylinder is an ignition signal of the ignition energy supply units of the other system belonging to the same cylinder as that of the ignition energy supply units of the one system.

5. The engine control device according to claim 3,
wherein the ignition signal of the ignition energy supply units of the other system to be used for determining the ignition cylinder is an ignition signal of the ignition energy supply units of the other system belonging to a cylinder which ignites right before the ignition cylinder.

6. The engine control device according to claim 4,
wherein a signal to be transmitted through the command signal line is turned on at the same time as, or after, a time when the ignition signal of the ignition energy supply units of the other system is turned on.

7. The engine control device according to claim 1,
wherein one side of the common signal line is connected to the engine control device, the other side is branched in the middle thereof, and the branched signal lines are each connected to the plurality of ignition energy supply units of the one system.

8. The engine control device according to claim 1,
wherein the ignition energy supply units of the two systems are each configured by coils, and a coil of the one system and a coil of the other system are disposed in series, and
wherein the common signal line is connected to a coil of a system which is disposed on a side near the engine control device among the ignition energy supply units of the two systems.

9. The engine control device according to claim 1,
wherein the ignition energy supply units of the two systems are each configured by coils, and a coil of the one system and a coil of the other system are disposed in series, and
wherein one side of the common signal line is connected to the engine control device, the other side is branched in the middle thereof, and the branched signal lines are each connected to a control circuit which is provided in correspondence with the coils of the one system among the ignition energy supply units of the two systems.

10. The engine control device according to claim 1,
wherein the ignition energy supply units of the two systems are each configured by coils, and a coil of the one system and a coil of the other system are disposed in parallel, and
wherein the common signal line is connected to a control circuit which is provided in correspondence with each coil of the one system among the ignition energy supply units of the two systems.

11. The engine control device according to claim 1,
wherein an energizing time of the ignition energy supply unit is controlled by the common signal line.

12. The engine control device according to claim 1,
wherein the ignition energy supply units of the two systems are configured by a discharge unit of an overlap discharge type which is provided with a coil and a boosting circuit to extend time for a spark discharge, and
wherein the common signal line is connected to the discharge unit among the ignition energy supply units of the two systems.

13. The engine control device according to claim 1,
wherein a discharge time of the ignition energy supply units is controlled by the common signal line.

14. The engine control device according to claim 1,
wherein a discharge allowance of the ignition energy supply units is controlled by the common signal line.

15. An engine control device which controls a multiple-cylinder engine in which ignition energy supply units of two systems are provided for every cylinder,
wherein a signal is received through a common signal line from a plurality of ignition energy supply units of one system among the ignition energy supply units of the two systems to detect an abnormality of the plurality of ignition energy supply units of the one system.

16. The engine control device according to claim 15,
wherein an ignition energy supply unit to which the command signal line is connected is stopped in a case where an abnormality is detected.

17. An engine control system, comprising:
ignition energy supply units of two systems which are provided for every cylinder of a multiple-cylinder engine; and,
an engine control device which controls the ignition energy supply units of the two systems,
wherein the engine control device transmits a signal through a command signal line to a plurality of ignition energy supply units of one system among the ignition energy supply units of the two systems to control the plurality of ignition energy supply units of the one system.

18. The engine control system according to claim 17,
wherein the ignition energy supply units of the two systems are configured to overlap a discharge of the ignition energy supply units of the one system and a discharge of the ignition energy supply units of the other system to be output.

19. The engine control system according to claim 17,
wherein one side of the common signal line is connected to the engine control device, the other side is branched in the middle thereof, and the branched signal lines are each connected to the plurality of ignition energy supply units of the one system.

* * * * *